United States Patent
Lunner et al.

(10) Patent No.: US 10,321,241 B2
(45) Date of Patent: Jun. 11, 2019

(54) DIRECTION OF ARRIVAL ESTIMATION IN MINIATURE DEVICES USING A SOUND SENSOR ARRAY

(71) Applicant: Oticon A/S, Smørum (DK)

(72) Inventors: Thomas Lunner, Smørum (DK);
Fredrik Gustafsson, Linköping (SE);
David Lindgren, Linköping (SE);
Gustaf Hendeby, Linköping (SE)

(73) Assignee: Oticon A/S, Smørum (DK)

( * ) Notice: Subject to any disclaimer, the term of this patent is extended or adjusted under 35 U.S.C. 154(b) by 0 days.

(21) Appl. No.: 15/643,074

(22) Filed: Jul. 6, 2017

(65) Prior Publication Data
US 2019/0014422 A1 Jan. 10, 2019

(30) Foreign Application Priority Data
Jul. 6, 2016 (EP) .................................. 16178088

(51) Int. Cl.
*H04R 25/00* (2006.01)
*G10L 21/0216* (2013.01)

(52) U.S. Cl.
CPC ......... *H04R 25/407* (2013.01); *H04R 25/402* (2013.01); *H04R 25/405* (2013.01);
(Continued)

(58) Field of Classification Search
CPC .. H04R 25/405; H04R 25/407; H04R 25/505; H04R 25/554; H04R 25/558;
(Continued)

(56) References Cited

U.S. PATENT DOCUMENTS

| 5,793,875 A | * | 8/1998 | Lehr | ..................... H04R 25/554 |
| | | | | 381/313 |
| 9,354,295 B2 | * | 5/2016 | Kim | ....................... G01S 3/8006 |

(Continued)

FOREIGN PATENT DOCUMENTS

| EP | 1 091 614 A1 | 4/2001 |
| EP | 2 320 680 A2 | 5/2011 |

OTHER PUBLICATIONS

Fredrik Gustafsson et al., "Direction of Arrival Estimation in Sensor Arrays Using Local Series Expansion of the Received Signal", 18th International Conference on Information Fusion, Jul. 6, 2015, pp. 761-766.
(Continued)

*Primary Examiner* — Jesse A Elbin
(74) *Attorney, Agent, or Firm* — Birch, Stewart, Kalasch & Birch, LLP

(57) ABSTRACT

A hearing device comprises a sound system for estimating the direction of arrival of sound emitted by one or more sound sources creating a sound field. The sound system comprises an array of N sound receiving transducers (microphones), each providing an electric input signal, a processing unit comprising a) a model unit comprising a parametric model configured to be able to describe the sound field at the array as a function of the direction of arrival in a region surrounding and adjacent to the array; b) a model optimizing unit configured to optimize said model with respect to its parameters based on said sound samples; c) a cost optimizing unit configured to minimize a cost function of the model with respect to said direction of arrivals; d) an estimating unit configured to estimate the direction of arrival based on said parametric model with the optimized parameters and the optimized cost function.

19 Claims, 10 Drawing Sheets

(52) U.S. Cl.
CPC ......... *H04R 25/505* (2013.01); *H04R 25/554* (2013.01); *H04R 25/558* (2013.01); *G10L 2021/02166* (2013.01); *H04R 25/40* (2013.01); *H04R 2225/021* (2013.01); *H04R 2225/025* (2013.01); *H04R 2225/55* (2013.01)

(58) Field of Classification Search
CPC .......... H04R 2225/01; H04R 2225/025; H04R 2225/41; H04R 2225/55; H04R 1/326; H04R 3/005; H04R 2201/401; H04B 7/0617; H04B 7/0854; G01S 3/46; G01S 3/783; H04W 16/28; G10L 2021/02166
USPC ........................................................ 381/313
See application file for complete search history.

(56) References Cited

U.S. PATENT DOCUMENTS

2012/0127832 A1  5/2012  Mejia
2014/0098981 A1  4/2014  Lunner et al.

OTHER PUBLICATIONS

Doron et al., "Robust Wavefield Interpolation for Adaptive Wideband Beamforming," Signal Processing, vol. 88, 2008 (published on web Jan. 15, 2008), pp. 1579-1594.

Manabe et al., "Conductive Rubber Electrodes for Earphone-Based Eye Gesture Input Interface," Session: Ins and Outs, ISWC'13, Zurich, Switzerland, Sep. 9-12, 2013, pp. 33-39.

Goetze et al., "Direction of Arrival Estimation Based on the Dual Delay Line Approach . . . ," Proceedings of 2007 International Symposium on Intelligent Signal Processing and Communication Systems, Nov. 28-Dec. 1, 2007 (Nov. 1, 2007), Xiamen, China, pp. 84-87, XP031211473.

Képesi et al., "Joint Position-pitch Estimation for Multiple Speaker Scenarios," IEEE, HSCMA 2008, Piscataway, USA, May 6, 2008, pp. 85-88, XP031269754.

* cited by examiner

DIRECTION OF ARRIVAL ESTIMATION IN MINIATURE DEVICES USING A SOUND SENSOR ARRAY

The present disclosure relates generally to methods and systems for estimation of arrival of a sound energy by means of arrays of sound-sensitive sensors, e.g. microphones, and more specifically to the application of such methods and systems in miniature electronic devices, e.g. portable devices, such as body worn devices, e.g. hearing devices, such as hearing aids.

BACKGROUND

Still the by far largest problems for the hearing impaired is to understand speech in the presence of competing sources. This stems from the lost ability to segregate sources well enough to be able to "tune in" on the currently most interesting signals. Normal-hearing persons has this ability to segregate and tune in, usually referred to as the cocktail party effect. The brain and the auditory system do this tuning by adjusting the neural gain towards the sources of interest. Recent brain-imaging data shows that the typical neural gain is in the order of 10-12 dB. This means that the brain neurologically can emphasize a source of interest by an amount of 10-12 dB. This neural gain is much lower for the hearing impaired, it is close to 0 dB, which explains why the hearing impaired complains that sounds tend to fuse, that is they can no longer be segregated and tuned in to by the hearing impaired.

A directional microphone/beamformer works by suppressing sounds arriving from some directions, while maintaining good sensitivity from one direction (usually the front). The 'opposite' of a directional microphone is an omni-directional microphone, which has the same sensitivity towards sound from all directions. A first-order subtractive microphone usually implements the directional microphone in a hearing aid, where the output from two omni-directional microphones are subtracted. The sound recorded at the rear microphone is time-delayed and then subtracted from the frontal microphone. The time it takes for the sound to travel between the microphones is called the external delay, and it is calculated as the distance between the microphones divided by the speed of sound. The delay that is introduced electrically inside the hearing aid is called the internal delay. If the sound arrives from the rear and the internal delay is equal to the external delay, the front and delayed rear signals will cancel out each other and the hearing aid will thus be insensitive to sounds arriving from the rear. The ratio between the internal and external delay, called the delay ratio, determines the sensitivity to sounds arriving from different directions. The sensitivity pattern of a directional microphone is usually indicated using a polar plot. The polar plot reveals the microphones sensitivity to sound arriving from different directions.

The above argumentation indicates that the current beamforming technology, even with binaural beam formers, does not fulfill the necessary 10-12 dB segregation under reverberant conditions to re-establish the hearing impaired persons lost segregation abilities. Furthermore, the beams are too wide (30+ degrees) to be really selective. Other configurations with narrower beams exist, but with increased side lobes from the back.

A number of remote microphones placed close to the talker and using for example eye-gaze to let the user intuitively control which talker to tune in to can in principle solve the problem.

SUMMARY

A more general solution would need head-mounted directional microphones that segregates each talker and allows the user to tune in to one or more of the simultaneous or individually active talkers (thereby implementing a number of (distinct) virtual microphones). It would be desirable to have access to microphone systems of such dimensions that they could be installed in a hearing aid or by some other arrangements be worn on the head of a hearing impaired person. FIG. 8 illustrates such a scenario.

The present disclosure presents an alternative basic principle for beamforming in miniature devices, such as hearing devices, e.g. hearing aids, or in other portable devices employing acoustic sound sensing technology, e.g. mobile telephones or speaker phones. For such devices, which are subject to constraints regarding physical dimensions, beamformers that are more selective than state of the art beamforming technology can be provided according to the present disclosure.

A prior art device used to locate and characterize sound sources is a so-called acoustic camera. It consists of a group of microphones—also called a microphone array—that are simultaneously acquired to form a representation of the location of the sound sources. An acoustic camera generally consists of a microphone array and optionally an optical camera. The microphone signals—analog or digital—are acquired simultaneously or with known relative time delays to be able to use the phase difference between the signals. As the sound propagate in the medium (air, water . . . ) at a finite known speed, a sound source is perceived by the microphones at different time instants and at different sound intensities that depend on both the sound source location and the microphone location. One popular method to obtain an acoustic image from the measurement of the microphone is to use beamforming: By delaying each microphone signal relatively and adding them, the signal coming from a specific direction is amplified while signals coming from other directions are canceled. The power of this resulting signal is then calculated and reported on a power map at a pixel corresponding to the direction. The process is iterated at each direction where the power needs to be computed.

The dimensions of acoustic cameras are however typically a magnitude too large to be head-mounted. Thus, a typical diameter is 60 cm, and the acoustic camera is typically provided with hundred or even more microphones, with a narrow beam (less than 10 degrees) and with an attenuation of side lobes of about 40 dB (segregation ability). The large number of microphones and the (large) physical dimensions are the basis for high angular resolving power.

The problem is that state-of-the art hearing aid delay-and-sum beam formers do not segregate well enough. Table 1 below shows the segregation abilities (articulation-directivity index) for beams pointing in different directions for a setup with 2×2 microphones (two microphones in the left ear and two in the right ear as in current hearing aids with a simulated ideal ear-to-ear wireless link) based on recordings in an anechoic chamber. The table indicates a segregation ability in the range of about 4-9 dB depending on direction. However, this is under anechoic conditions. Under realistic, reverberant, conditions the segregation ability is only about 3-4 dB.

TABLE 1

Articulation-Directivity Index for a typical prior art binaural directional hearing aid fitting.

| | 0° | 30° | 60° | 90° | 120° | 150° | 180° | 300° |
|---|---|---|---|---|---|---|---|---|
| AI-DI [dB] | 6.6 | 8.2 | 6.7 | 4.4 | 86.3 | 8.4 | 8.8 | 7.4 |

The directivity index (DI) is a quantity that characterizes the directivity of an acoustic device such as a hearing aid, thus the higher the value of the DI, the more directional is the response of the hearing aid.

The Articulation-Directivity Index (AI-DI) can be considered as a further development of the directivity index. The AI-DI is a score which uses the weighing of specific frequencies (or frequency bands) that is used in the articulation index (known also as the Speech Intelligibility Index) in order to emphasize those frequency components that are of most importance in order to understand speech and applies this frequency weighting to the DI, thereby obtaining a measure of directivity, which is more realistic with respect to speech sounds. Thus, the AI-DI determines a single number that predicts the anticipated benefits of a directional system specifically with respect to understanding speech in a realistic acoustic environment.

Direction of arrival (DOA) estimation from an array of sensors ('a sensor array') is a well-studied problem in literature, where there is a range of algorithms such as MUSIC (Multiple Signal Classifier), ESPRIT (Estimation of Signal Parameters via Rotational Invariance Technique), deterministic and stochastic maximum likelihood (ML), etc. These are based on an assumption of narrow-band and far-field signals, and the algorithms are often tailored for regular arrays (e.g. from uniformly linear to circular arrays). The underlying principle is to estimate the delay of the signal between the sensors, and this delay corresponds to the DOA. Further, the rule of thumb is that the sensors in the array should be separated about half the wavelength of the received signal. Typical applications are in radio and sonar where the signal is modulated on a carrier, thus satisfying the narrow-band assumption. The weak point in this classical theory is how to estimate the number of sources. Recently, significant progress has been made in tuning-free methods that also estimated the number of sources such as the SPICE (SParse Iterative Covariance-based Estimation) algorithm.

The above and other objects and advantages are obtained by a method and system and device according to the present disclosure.

According to the principles of the present disclosure there is provided a method, system or device that can provide wideband direction of arrival (DOA) estimation and which method, system or device can be used in both near-field and far-field setups.

In contrast to the prior art, the present disclosure relates to the case of opportunistic acoustic signal sources, which are typically wideband. Examples include motorized vehicles outdoors (that should be attenuated) or talking people in a conference room (that should be amplified). One solution is to focus the signal into a narrowband signal, for instance using the WINGS (Wavefield-Interpolated Narrowband-Generated Subspace) algorithm (cf. e.g. [Doron & Nevet; 2008]), and thereby recasting the problem into a standard one. The WINGS algorithm projects a multitude of different frequencies onto one frequency using subspace techniques, so a narrowband approximation of the original signal is obtained.

The method, system and device according to the present disclosure is based on space delays rather than time delays. The derivation is based on a parametric model configured to be able to describe the sound field as a function of the direction of arrival in a region surrounding and adjacent to an array of sound receiving sensors, such as microphones. In an embodiment, a Taylor expansion of the signal at the array of sensors is carried out, where the delays over space are related to a reference point in the array through the Taylor expansion.

A Method:

According to a first aspect of the present disclosure there is provided a method for estimating the direction of arrival of sound emitted by one or more sound sources creating a sound field in the surroundings of the one or more sound sources, the method comprising:

providing an array of sound sensitive sensors, such as microphones, each sensor providing a stream of digital samples representing the sound field of the surroundings;

providing at least one sample of said surrounding sound field from each of said sensors at substantially the same time instant;

providing a parametric model configured to be able to describe the sound field as a function of the direction of arrival in a region surrounding and adjacent to said array;

optimizing said model with respect to its parameters based on said sound samples; and minimizing a cost function of the model with respect to said direction of arrivals.

In an embodiment, the parametric model is configured to operate in a space delay domain (rather than in a time domain). In an embodiment, a Taylor expansion of the signal at the array of sensors is carried out, where the delays over space are related to a reference point in the array through the Taylor expansion.

In an embodiment of the first aspect, the above mentioned model is a Taylor expansion model and the sound signal received at each of said respective sensor is decomposed in a Taylor series expansion of order L, in which the signal derivatives are determined by a linear $$\hat{\theta} = \operatorname*{argmin}_{\theta} V(\theta, \hat{S}(\theta)) = \operatorname*{argmin}_{\theta} \|z - \mathcal{T}(\theta)\hat{S}(\theta)\|^2$$

least squares method, and wherein the direction of arrival $\theta$ is estimated by the expression:

where $\|\cdot\|^2$ represents the least squares loss (or error) function, z is a mixed signal comprising sound signal s and additional noise $\epsilon$, and $T(\theta)$ is a vector comprising the first L Taylor expansion coefficients.

In an embodiment of the first aspect the array of sound sensitive sensors is an array of microphones configured to be mounted on a human head.

In an embodiment of the first aspect, the array is configured to be provided in a hearing aid, such as a behind-the-ear hearing aid, an in-the-ear hearing aid or hearing glasses.

A Sound System:

According to a second aspect of the present disclosure there is provided a (sound) system or device for wideband direction of arrival (DOA) estimation, which device can be used in both near-field and far-field setups.

The method and system or device according to the aspects of the present disclosure are operative down to very low sampling frequencies, which is an advantage in systems with hardware restrictions like battery-powered sensor nodes (e.g. portable devices, such as hearing aids).

According to the second aspect of the present disclosure there is provided a sound system, e.g. a hearing system, or device, e.g. a hearing device, for estimating the direction of arrival of a sound signal emitted from one or more sound sources, the system or device comprising:
- a sound sensor unit comprising an array of N sound sensitive sensors, such as microphones, each providing an electric input signal;
- a sampling unit providing at least one sample of the surrounding sound field from each of said electric input signals at substantially the same time instant; and
- a processing unit comprising
  - a model unit comprising a parametric model configured to be able to describe the sound field at the array as a function of the direction of arrival in a region surrounding and adjacent to the array;
  - a model optimizing unit configured to optimize the model with respect to its parameters based on the sound samples;
  - a cost optimizing unit configured to minimize a cost function of the model with respect to the direction of arrivals;
  - an estimating unit configured to estimate the direction of arrival based on the parametric model with the optimized parameters and the optimized cost function.

In an embodiment, the sound source system is configured to operate on a wideband acoustic signal, e.g. in the range between 0 and 12 kHz, such as between 20 Hz and 10 kHz or between 50 Hz and 8 kHz. In an embodiment, the sound system is configured to activate beams at different DOA ($\theta$) at the same time, and thus can be used in a multi-talker environment (cf. e.g. FIG. 8).

In an embodiment, the sound system, e.g. the sampling unit, comprise(s) an analogue-to-digital (AD) converter to digitize an analogue input with a predefined sampling rate, e.g. 20 kHz, to provide a stream of digital samples. In an embodiment, the hearing devices comprise a digital-to-analogue (DA) converter to convert a digital signal to an analogue output signal, e.g. for being presented to a user via an output unit, e.g. and output transducer.

In an embodiment of the second aspect, the array of sound sensitive sensors comprises an array of sound sensitive transducers (sound receiving transducers) e.g. microphones, configured to be mounted on a human body, e.g. at or near the head, e.g. attached to a headband, or a frame of spectacles (glasses, goggles, or the like).

The terms 'sound receiving transducers' and 'sound sensitive transducers', are used interchangeably without any intended difference in meaning.

In an embodiment, the array of sound sensitive sensors comprises microphones implemented on a chip, e.g. MEMS microphones, e.g. implemented on the same chip, e.g. together with electronic circuitry for processing the electric input signals from the microphones. This has the advantage of enabling a miniature implementation of a microphone array (and accompanying signal processing).

In an embodiment, at least some of the sound sensitive sensors or transducers, e.g. microphones, are located on or integrated with a head band, or similar structure (e.g. a piece of jewelry, such as a necklace) adapted to be mounted on the body of the user, e.g. on the head or around the neck of the user. In an embodiment, the sound sensitive sensors are reversibly mountable on the user's body (e.g. so that they can be mounted in substantially the same mutual configuration relative to each other, if removed and remounted). In an embodiment, the sound sensitive transducers are fixedly mounted on the user's body, e.g. head, e.g. by full or partial implantation and/or fixture to the skin or tissue of the user. In an embodiment, the sound sensitive transducers form part of a hearing aid, e.g. an air conduction hearing aid, a bone conduction (e.g. bone anchored) or cochlear implant type of hearing aid. In an embodiment, the sound sensitive sensors are located in a predetermined geometrical configuration, when mounted on the user's body. In an embodiment, the sound sensitive sensors are arranged in a substantially planar geometrical configuration. In an embodiment, the sound sensitive sensors are arranged in a three dimensional geometrical configuration. In an embodiment, the sound sensitive sensors are arranged in a substantially linear geometrical configuration. In an embodiment, the sound sensitive sensors are arranged in a curved, e.g. substantially, fully or partially circular geometrical configuration (e.g. on a part of a circle, e.g. spanning more than 60°). In an embodiment, the sound sensitive sensors are arranged in a substantially, fully or partially spherical geometrical configuration (e.g. on a part of a sphere, e.g. spanning a semi sphere, or a fraction of a semi sphere, e.g. more than 25% of the area of a semi-sphere, such as more than 50%). In an embodiment, the array of sound sensitive transducers (or at least some, such as a majority, of the sound sensitive transducers) is located on a functional structure for wear by the user, e.g. on a pair of glasses (e.g. on one or more of the bars, such as a side bar), on a necklace, on a headband, etc. In an embodiment, the sound sensitive sensors are arranged on the head (e.g. around the head or neck) of the user to substantially cover all angles of space around the user. In an embodiment, the sound sensitive sensors are distributed evenly, e.g. as one array or in groups or arrays. In an embodiment the sound sensitive sensors are distributed non-uniformly to give less priority to certain, e.g. predefined, directions or ranges of directions.

In general, it is advantageous that the number of sound sensitive sensors (e.g. microphones) are larger than the number of (locations) of audio sources of interest, e.g. twice as large or 5 times as large, or more. In an embodiment, the sound system is configured to provide that the number N of sound sensitive sensors is larger than 3, e.g. in the range from 3 to 10 or larger than 10, such as larger than 50.

In an embodiment, the sound system is configured to provide that the distance d between adjacent sound sensitive sensors (e.g. sound receiving transducers, e.g. microphones) is smaller than 0.02 m (20 mm), such as smaller than 0.01 m, such as smaller than 0.008 m, such as smaller than 0.005 m, such as smaller than 0.002 m (2 mm). In an embodiment, the sound system is configured to provide that the distance between adjacent sound sensitive sensors is smaller than $\lambda/2$, where $\lambda$ is the wavelength of sound at a maximum frequency of interest (if e.g. fmax=10 kHz, $\lambda$=34 mm (in air), so d≤17 mm). In an embodiment, the sound sensitive sensors are located in a predefined pattern, e.g. exhibiting a certain symmetry, e.g. a rotational symmetry (e.g. Ns-fold, Ns>1), and or a mirror symmetry, and or a translational symmetry. In an embodiment, the sound sensitive sensors are arranged in the sound system (e.g. in a hearing device) so that their geometrical centers are located at a regular pattern, e.g. in a periodic pattern. In an embodiment, such periodic pattern may be a 2D-pattern or a 3D-pattern. In an embodiment, the sound sensitive sensors are located in a predefined, but non-repetitive or non-symmetric pattern. In an embodiment, a distance between neighboring sound sensitive sensors is defined by a repetitive unit cell. In an embodiment, the location of the individual sound sensitive sensors is known (e.g. predefined or determined during operation by a calibration procedure), but does not constitute a repetitive pattern.

In an embodiment, the location of the individual sound sensitive sensors is not known or predetermined.

In an embodiment, the sound system comprises a beamformer filtering unit for providing a beamformed signal based on one or more beamformer input signals representing said surrounding sound field, and configured to use said estimate the direction of arrival in the determination of the beamformed signal. In an embodiment, the beamformer filtering unit is configured to use at least some (such as a majority or all) of the electric input signals from the N sound sensitive sensors to provide the beamformed signal.

In an embodiment, the sound system (e.g. the beamformer filtering unit) is configured to implement an angular beam pattern exhibiting an attenuation of side lobes in a plot of attenuation versus angle of more than a threshold value of 10 dB, such as more than 15 dB, such as more than 20 dB (cf. e.g. FIG. 9). In an embodiment, the beam pattern exhibits said attenuation above a threshold value at a frequency of interest for the application in question, e.g. the human audible frequency range from 20 Hz to 20 kHz, e.g. in a frequency range of interest for speech, e.g. in a range from 1 kHz to 6 kHz, such as in a range between 2 kHz and 4 kHz, e.g. at or around 3 kHz.

In an embodiment, the sound system (e.g. the beamformer filtering unit) is configured to implement an angular beam pattern comprising a main lobe of less than 30°. In an embodiment, the beam pattern comprises a main lobe exhibiting an angular extension of less than 20°, such as less than 15°, such as less than 10°. The term 'a main lobe of less than xx°' is taken to mean that there is an angular distance between two closest minima around the main lobe of less than xx°, cf. e.g. FIG. 9.

In an embodiment, the sound system comprises a filter, e.g. a low pass filter, configured to isolate a fundamental frequency of the electric input signals corresponding to a human voice from higher lying harmonics and providing respective filtered electric input signals. In an embodiment, the sound system is configured to use such filtered electric input signals for identification of the direction of arrival (according to the present disclosure). In an embodiment, the filter is a low pass filter. In an embodiment, the filter has a cut-off frequency less than 1 kHz, e.g. less than 500 Hz, e.g. less than 300 Hz.

In an embodiment, the sound system comprises a user interface allowing a user to control functionality of the sound system. In an embodiment, the sound system comprises an auxiliary device configured to implement a user interface allowing a user to control functionality of the sound system.

In an embodiment, the sound system comprises a network of arrays of sound sensitive sensors. The network of arrays of sound sensitive sensors, each array termed a sensor array, may e.g. comprise respective sensor arrays located at (and/or between) a left and right ear or a user, e.g. in hearing devices located at (and/or between) left and right ear or a user. In an embodiment, the sound system is configured to provide that the sensor arrays are connected in a communication network allowing at least some (e.g. a majority or all) of the electric input signals provided by the receiving transducers to be evaluated together in a processing unit, e.g. in connection with a beamformer filtering unit.

In an embodiment, the sound system comprises a tracking unit configured to track one or more sound sources over time. In an embodiment, the tracking unit is based on near-field tracking. In an embodiment, the tracking unit comprises a Kalman filter. Near-field localization and tracking is e.g. discussed in [Gustafsson et al., 2015].

In an embodiment, the sound system is configured to estimate a direction of arrival to a multitude of active target sound sources (e.g. sound sources comprising speech, e.g. within a given time period).

In an embodiment of the second aspect the array of sound sensitive sensors is configured to be incorporated in a hearing aid, e.g. adapted in size and location to form part of a hearing device.

A Hearing Device:

In a third aspect of the present disclosure, a hearing device comprising a sound system as described above, in connection with the drawings and in the claims is furthermore provided.

In an embodiment, the hearing device comprises a hearing aid, e.g. an air conduction type hearing aid, such as a behind-the-ear hearing aid or an in-the-ear hearing aid, a bone conduction type of hearing aid, a cochlear implant type of hearing aid, or pair of hearing glasses. In an embodiment, the hearing device, e.g. hearing aid, comprises hearing glasses or a headband comprising at least some (such as a majority or all) of the array of sound sensitive sensors (e.g. microphones).

In an embodiment, the hearing device comprises a beamformer filtering unit for providing a beamformed signal based on one or more beamformer input signals representing said surrounding sound field, and configured to use said estimate of the direction of arrival in the determination of the beamformed signal. In an embodiment, the hearing device is configured to provide that the beamformer filtering unit receives at least some of said electric input signals from said sound sensor array, and provides said beamformed signal as a weighted combination of said at least some of said electric input signals and possibly further electric input signals.

In an embodiment, the beamformer input signals comprise at least one, such as a majority, such as all, of the electric input signals from the sound sensor unit (comprising one or more arrays of N sound sensitive sensors).

In an embodiment, the beamformer input signals comprise (such as consist of) electric input signals from input transducers (e.g. microphones) that do NOT form part of the sound sensor array.

In an embodiment, the beamformer filtering unit is configured to determine a beam pattern based on estimates of direction of arrival of a multitude of active target sound sources. In an embodiment, the beamformer filtering unit is configured to determine the beam pattern so that sound from the estimated directions of arrival is left substantially unaltered (maintained), while sound from other directions is attenuated (compared thereto).

In an embodiment, the hearing device is configured to activate beams at (having) different direction of arrivals at the same time.

In an embodiment, the hearing device is configured to track a beam pattern that follows the active target sound sources over time.

In an embodiment, the sound sources of interest to a user of the hearing device comprises speech. In an embodiment, the sound sources of interest are spatially localized (e.g. in the sense that a specific direction of arrival of sound from a given sound source can be determined).

Advantages of embodiments of the method and/or sound system and/or hearing device according to the present disclosure compared to classical DOA methods may include:

- The time sampling can be arbitrary. Also very slow sampling, say every second, can be used to minimize energy consumption.
- The spatial separation between the microphones, should preferably be closer (less) than half the wavelength (at a representative audio frequency (and medium), e.g. 2 kHz ($\lambda$=170 mm in air), or 4 kHz ($\lambda$=85 mm)). This is an advantage for head-mounted arrays. There is no lower limit on the separation in theory, so even an ear-mounted array is plausible. In practice the SNR determines a lower bound of separation.
- The scheme applies to both wideband (real sound sources) as well as to narrow band signals (which are in focus in most algorithms today).
- The array can have arbitrary configuration and is not restricted to uniform arrays. For instance, the array can be mounted to eyeglasses or (e.g. virtual reality (VR)) goggles, e.g. hearing glasses.
- In theory, the scheme applies to multiple sources, where the number of sources can be estimated as well. However, the method does not scale well with the number of sources, since the number of parameters increases linearly with the number of sources, so the required number of array elements also increases linearly.
- The scheme can be directly parameterized in the source location, and hence it works equally well in near-field as in far-field. This is relevant if the attended sound sources are very close to the listener. The rule of thumb is that the near field is within one wavelength, so for one scenario the near field is one meter. In a cocktail party, there may be many sources close to the listener.
- The algorithm is quite suitable for parallel implementations.

A Data Processing System:

In a further aspect, a data processing system comprising a processor and program code means for causing the processor to perform at least some (such as a majority or all) of the steps of the method described above, in connection with the drawings and in the claims is provided by the present application.

A Non-Transitory Application:

In a further aspect, a non-transitory application, termed an APP, is provided by the present disclosure. The APP comprises executable instructions configured to be executed on an auxiliary device to implement a user interface for a sound system or a hearing device or a hearing system described above in the connection with the drawings, and in the claims. In an embodiment, the APP is configured to run on a remote control device, a cellular phone, e.g. a smartphone, or on another portable device allowing communication with the sound system, the hearing device or a hearing system.

Definitions

In the present context, a 'hearing device' refers to a device, such as e.g. a hearing instrument or an active ear-protection device or other audio processing device, which is adapted to improve, augment and/or protect the hearing capability of a user by receiving acoustic signals from the user's surroundings, generating corresponding audio signals, possibly modifying the audio signals and providing the possibly modified audio signals as audible signals to at least one of the user's ears. A 'hearing device' further refers to a device such as an earphone or a headset adapted to receive audio signals electronically, possibly modifying the audio signals and providing the possibly modified audio signals as audible signals to at least one of the user's ears. Such audible signals may e.g. be provided in the form of acoustic signals radiated into the user's outer ears, acoustic signals transferred as mechanical vibrations to the user's inner ears through the bone structure of the user's head and/or through parts of the middle ear as well as electric signals transferred directly or indirectly to the cochlear nerve of the user.

The hearing device may be configured to be worn in any known way, e.g. as a unit arranged behind the ear with a tube leading radiated acoustic signals into the ear canal or with a loudspeaker arranged close to or in the ear canal, as a unit entirely or partly arranged in the pinna and/or in the ear canal, as a unit attached to a fixture implanted into the skull bone, as an entirely or partly implanted unit, etc. The hearing device may comprise a single unit or several units communicating electronically with each other.

More generally, a hearing device comprises an input transducer for receiving an acoustic signal from a user's surroundings and providing a corresponding input audio signal and/or a receiver for electronically (i.e. wired or wirelessly) receiving an input audio signal, a (typically configurable) signal processing circuit for processing the input audio signal and an output means for providing an audible signal to the user in dependence on the processed audio signal. In some hearing devices, an amplifier may constitute the signal processing circuit. The signal processing circuit typically comprises one or more (integrated or separate) memory elements for executing programs and/or for storing parameters used (or potentially used) in the processing and/or for storing information relevant for the function of the hearing device and/or for storing information (e.g. processed information, e.g. provided by the signal processing circuit), e.g. for use in connection with an interface to a user and/or an interface to a programming device. In some hearing devices, the output means may comprise an output transducer, such as e.g. a loudspeaker for providing an air-borne acoustic signal or a vibrator for providing a structure-borne or liquid-borne acoustic signal. In some hearing devices, the output means may comprise one or more output electrodes for providing electric signals.

In some hearing devices, the vibrator may be adapted to provide a structure-borne acoustic signal transcutaneously or percutaneously to the skull bone. In some hearing devices, the vibrator may be implanted in the middle ear and/or in the inner ear. In some hearing devices, the vibrator may be adapted to provide a structure-borne acoustic signal to a middle-ear bone and/or to the cochlea. In some hearing devices, the vibrator may be adapted to provide a liquid-borne acoustic signal to the cochlear liquid, e.g. through the oval window. In some hearing devices, the output electrodes may be implanted in the cochlea or on the inside of the skull bone and may be adapted to provide the electric signals to the hair cells of the cochlea, to one or more hearing nerves, to the auditory brainstem, to the auditory midbrain, to the auditory cortex and/or to other parts of the cerebral cortex.

A 'hearing system' refers to a system comprising one or two hearing devices, and a 'binaural hearing system' refers to a system comprising two hearing devices and being adapted to cooperatively provide audible signals to both of the user's ears. Hearing systems or binaural hearing systems may further comprise one or more 'auxiliary devices', which communicate with the hearing device(s) and affect and/or benefit from the function of the hearing device(s). Auxiliary devices may be e.g. remote controls, audio gateway devices, mobile phones (e.g. SmartPhones), public-address systems, car audio systems or music players. Hearing devices, hearing systems or binaural hearing systems may e.g. be used for compensating for a hearing-impaired person's loss of hearing capability, augmenting or protecting a normal-hearing person's hearing capability and/or conveying electronic audio signals to a person. Embodiments of the disclosure may e.g. be useful in applications such as portable electronic devices comprising a sound input, e.g. hearing aids, headsets, ear phones, active ear protection systems, etc.

BRIEF DESCRIPTION OF DRAWINGS

The aspects of the disclosure may be best understood from the following detailed description taken in conjunction with the accompanying figures. The figures are schematic and simplified for clarity, and they just show details to improve the understanding of the claims, while other details are left out. Throughout, the same reference numerals are used for identical or corresponding parts. The individual features of each aspect may each be combined with any or all features of the other aspects. These and other aspects, features and/or technical effect will be apparent from and elucidated with reference to the illustrations described hereinafter in which:

DETAILED DESCRIPTION

The detailed description set forth below in connection with the appended drawings is intended as a description of non-limiting example embodiments of the method and system according to the present disclosure.

Figure 1A:
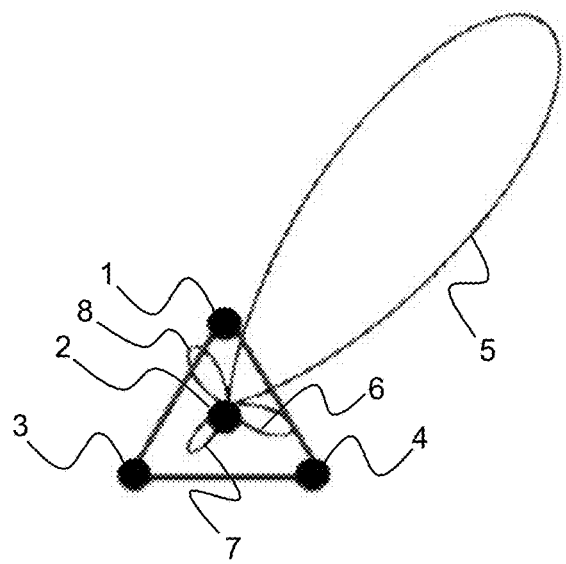
FIG. 1A shows a schematic plane view of a microphone array that can be used in embodiments of the present disclosure.

With reference to FIG. 1A there is shown a schematic plane view of a microphone array that can be used in embodiments of the present disclosure, but it is understood that many other configurations of arrays could also be used without departing from the scope of the present disclosure. The array comprises four microphones 1, 2, 3 and 4. FIG. 1A also shows a possible directional characteristic obtainable with the array, where the directional characteristic comprises a main lobe 5, two side lobes 6 and 8 and a rear lobe 7. Many other directional characteristics can be obtained dependent inter alia on the specific signal processing carried out on each specific microphone signal.

Figure 1B:
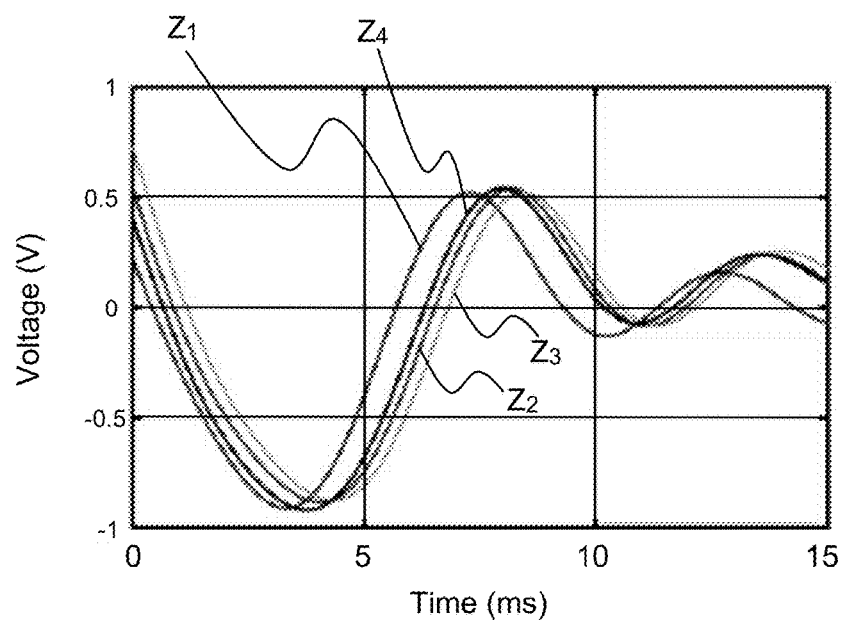
FIG. 1B shows an example of output voltages as a function of time from the four microphones in the array shown in FIG. 1A.

With reference to FIG. 1B there is shown an example of output voltages (between −1 V and +1 V) as a function of time (from 0 to 15 ms) from the four microphones in the array shown in FIG. 1A generated when a sound wave propagates through the array in a specific direction relative to the array. The respective output voltages are designated by $z_1$, $z_2$, $z_3$ and $z_4$, which is the same notation that will be used in the detailed description given below. In the example shown in FIG. 1B, the sound wave impinges on microphone 1 first followed by microphones 4, 2 and 3, which gives rise to the relative delays of the output voltages shown in FIG. 1B.

Figures 2A, 2B:
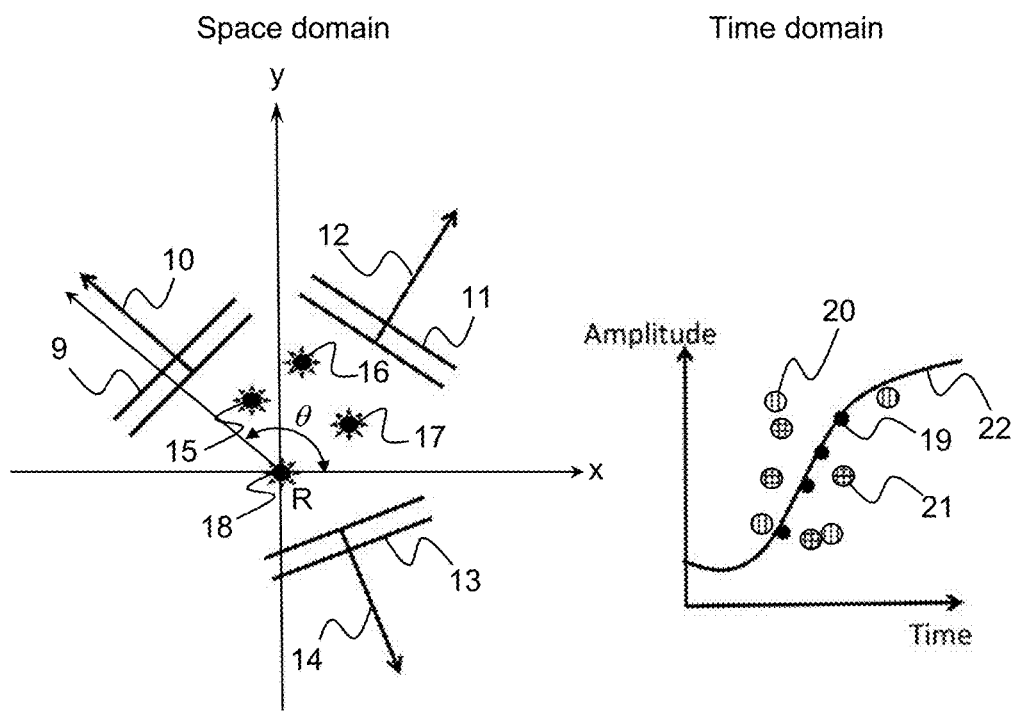
FIG. 2A shows an actual and two hypothetical propagating sound waves passing a microphone array comprising four microphones in different directions relative to the array.
FIG. 2B shows the amplitude of the response from the microphone array in FIG. 2A corresponding to each respective of passing sound waves shown in FIG. 2A.

With reference to FIG. 2A there is shown an actual propagating sound wave 9 travelling in the direction indicated by arrow 10 and two hypothetical propagating sound waves 11 and 13 travelling in directions 12 and 14, respectively. In this example, the microphone array comprises four microphones 15, 16, 17, 18 and one of these microphones—in the shown example microphone 18—can be regarded as a reference microphone R positioned at the origin of the coordinate system x, y. The direction of propagation is uniquely indicated by the angle θ in this two-dimensional example, but propagation in a three-dimensional space would also be possible within the scope of the disclosure and would require two angles θ, φ to uniquely indicate the direction of propagation of the sound wave (cf. also top part of FIG. 3A). The direction-of-arrival (DOA) for the acoustic waveform (9) is captured by the microphone array (stars 15, 16, 17, 18 indicating the individual microphones in FIG. 2A). FIG. 2A shows three (out of an infinite number of) hypotheses for the incoming directions (10, 12, 14). Only one of the directions (10) gives a reasonable and smooth reconstruction in the time domain, and thus defines the DOA. FIG. 2A can be taken to illustrate the scenario in the 'space domain' (as indicated in the top part of FIG. 2A).

With reference to FIG. 2B there is shown the amplitude of the response (the output voltage of the complete microphone array after suitable processing of the respective microphone signals versus time) from the four microphones of the array in FIG. 2A corresponding to each respective of the sound waves shown in FIG. 2A (the solid dots corresponding to wave 9 and direction 10, the cross-hatched dots corresponding to wave 11 and direction 12, and the vertically hatched dots corresponding to wave 13 and direction 14, respectively).

FIG. 2B illustrates, in an exemplified form, the basic concept of the present disclosure. The amplitude of the output from the array as a function of time resulting from sound wave 9 passing the array is shown at four specific points in time by the solid dots 19 in FIG. 2B. Similarly, the passing of sound wave 11 through the array will result in the output indicated by the dots 20 and the passing of sound wave 13 will result in the output indicated by the dots 21 in FIG. 2B. As it appears, only one of the sound waves (wave 9, direction 10), i.e. one of the infinitely many directions of propagation of the sound wave, gives a reasonable and smooth reconstruction in the time domain, and thus defines the direction of arrival (DOA) estimated according to the principles of the present disclosure. FIG. 2A can be taken to illustrate the scenario in the 'time domain' (as indicated in the top part of FIG. 2B).

The four microphones in FIG. 2A can be seen as a subset of an array, e.g. of a microphone array, e.g. implemented as a headband filled with microphones all around the head. The proposed method selects the wave front (9) in FIG. 2A passing the microphones in a "smooth" way represented in FIG. 2B by solid dots lying on amplitude versus time curve 22. This encompasses the most probable direction of arrival (DOA), with angle θ. If the angle is just a little bit smaller or larger, the pattern in FIG. 2B would not be as smooth and thus less probable as DOA. Thus by listening in the direction of θ (i.e. by directing a beam in the direction of θ using an appropriate combination of the microphone signals of the array, i.e. providing a beamformer filtering unit) a sensitive "directional microphone array" pointing in the θ direction may be implemented.

In the following a specific embodiment of far-field direction of arrival (DOA) estimation according to the present disclosure will be described.

A. Signal Model

Assume a plane propagation model where the sensors are located at $(x_n, y_n)$ for $n=1, 2, \ldots, N$. In this section it is assumed that the sensors are much closer to the origin of the coordinate system than the sound sources (e.g. so that plane wave approximation is valid).

A sound source emits an acoustic signal s(t) which reaches sensor n with a delay and additive Gaussian noise given by the expression:

$$\epsilon_n(t) \sim \mathcal{N}(0, \sigma_{\epsilon_n}^2)$$

The signal that reaches sensor n is then given by the expression:

$$z_n(t) = s(t + \tau_n(\theta)) + \epsilon_n(t), \quad (1)$$

which is one of the standard assumptions in DOA literature. In expression (1), θ is the angle between the x-axis of the coordinate system and the vector between sensor that is defined as a reference sensor R and the specific sound source (c.f. FIG. 2A). The delay can then be expressed as follows:

$$\tau_n(\theta) = \frac{x_n \cos\theta + y_n \sin\theta}{c}. \quad (2)$$

where c is the speed of sound (e.g. 343 m/s in air).

B. Assumptions

The main assumption is that the delay differences (between the microphone signals) are much smaller than the signal variation, which in terms of frequency can be stated as:

$$|\tau_n(\theta) - \tau_m(\theta)| \ll \frac{1}{f_{max}}, \forall m, n. \quad (3)$$

Since the delay difference is bounded by the array size D (for instance the typical diameter of the human head), expression (3) can be stated as:

$$D \ll \frac{c}{f_{max}}. \quad (4)$$

As an example, a motorized vehicle has the fundamental frequency of sound emission below 100 Hz (6000 rpm). The shortest wavelength is thus about 3 meters, and the array should be much smaller than this, for instance 0.3 meters. In the case of an average human head, D could be approximately 0.25 meters. In another example, fundamental frequencies of the human voice are used for identification of the direction of arrival. A fundamental frequency of a male voice is typically in the range from 85 Hz to 180 Hz. Correspondingly, a fundamental frequency of a female voice typically in the range from 165 Hz to 255 Hz. Hence a head mounted sensor array utilizing the scheme for estimating a direction of arrival according to the present disclosure may be used.

C. Taylor Expansion

If the condition in (3) is satisfied, the signal varies smoothly over the array, and a Taylor $$s(t + \tau_n(\theta)) = \sum_{i=0}^{L} \frac{\tau_n^i(\theta)}{i!} \frac{d^i}{dt^i} s(t) + \Delta_n(t). \quad (5)$$

series expansion of order L will represent the local behavior of the signal at sensor n. The following expression then applies:

The above expression can be written as a linear regression:

$$s(t + \tau_n(\theta)) = \tau_n^T(\theta)s + \Delta_n(t) \quad (6)$$

where $\Delta_n(t)$ denotes the higher order terms of the Taylor expansion which in the following will be neglected as a consequence of assumption (3), and wherein:

$$\mathcal{T}_n^T(\theta) = \begin{pmatrix} 1 & \tau_n(\theta) & \frac{1}{2!}\tau_n^2(\theta) & \ldots & \frac{1}{L!}\tau_n^L(\theta) \end{pmatrix} \quad (7a)$$

$$S^T(t) = \begin{pmatrix} s^{(0)} & s^{(1)} & s^{(2)} & \ldots & s^{(L)} \end{pmatrix} \quad (7b)$$

$$\text{and } s^{(L)} = \frac{d^L}{dt^L}s(t).$$

The original model given in expression (1) can thus be written as:

$$z_n(t) = \mathcal{T}_n^T(\theta) S(t) + \epsilon_n(t). \quad (8)$$

Considering the array, the following set of equations that are linear in the Taylor expansion parameters but nonlinear with respect to θ, apply:

$$z_1(t) = \tau_1^T(\theta)s(t) + \epsilon_1 \quad (9)$$

-continued $$z_2(t) = \tau_2^T(\theta)s(t) + \epsilon_2$$

$$\vdots$$

$$z_N(t) = \tau_N^T(\theta)s(t) + \epsilon_N$$

Where N denotes the number sound sensitive sensors (e.g. microphones).

This set of equations can conveniently be written in matrix form as:

$$z(t) = \mathcal{T}(\theta)S(t) + \epsilon \qquad (10)$$

where $$\mathcal{T}(\theta) = \begin{pmatrix} \tau_1^T(\theta) \\ \tau_2^T(\theta) \\ \vdots \\ \tau_N^T(\theta) \end{pmatrix} \qquad (11)$$

D. DOA Estimation

An essential feature of the partially linear model in expression (10) is that the least squares (LS) estimate, which coincides with the maximum likelihood (ML) estimate for Gaussian noise is conveniently computed by searching for the optimal direction of arrival θ, where all the linear parameters can be estimated analytically. That is, the optimization only concerns a scalar parameter, independently of the number N of array elements or the order L of the Taylor expansion. This also enables parallel structures of implementations, where the DOA angles are gridded and the measure of LS fit can be computed completely in parallel.

The LS estimate is per definition given by the expression:

$$(\hat{\theta}, \hat{S}) = \underset{\theta, S}{\operatorname{argmin}} V(\theta, S) \qquad (12)$$

where V denotes the LS loss function given by:

$$V(\theta, S) = \|z - \mathcal{T}(\theta)S\|^2 \qquad (13)$$

The linear sub-structure makes the estimation problem fit the separable least squares (SLS) framework which eventually makes solving the optimization problem more computationally efficient.

If θ is a fixed parameter, the estimate of s is given by:

$$\hat{s}(\theta) = \underset{s}{\operatorname{argmin}} V(\theta, s) \qquad (14)$$

$$= \underset{s}{\operatorname{argmin}} \|z - \mathcal{T}(\theta)s\|_F^2$$

For the above optimization problem, the estimate can be computed using least squares:

$$\hat{S}(\theta) = \mathcal{T}^{\dagger}(\theta)z, \qquad (15)$$

Where the cross-symbol denotes Moore-Penrose pseudo-inverse.

This leads to the following estimate of the direction of arrival θ:

$$\hat{\theta} = \underset{\theta}{\operatorname{argmin}} V(\theta, \hat{S}(\theta)) = \underset{\theta}{\operatorname{argmin}} \|z - \mathcal{T}(\theta)\hat{S}(\theta)\|^2. \qquad (16)$$

If θ is one or two dimensional, the estimate of θ can be computed quite efficiently by evaluating it over a fine grid, which is, as mentioned above, suitable for parallel implementations.

In the foregoing, only a single sample of the array has been formulated. However, a batch of samples at $t=t_1$, $t_2, \ldots, t_m$ can be modeled in the same way by stacking these samples into an mN vector and expanding T(θ) into a block diagonal matrix with m identical blocks, provided that θ varies insignificantly over the duration of the batch.

E. Multiple Signal Sources

In principle, the linearized signal model (10) can be extended to multiple signal sources straightforwardly. If the number of signal sources is denoted by K, expression (10) becomes:

$$z(t) = \sum_{k=1}^{K} \mathcal{T}(\theta_k)S_k(t) + \epsilon. \qquad (17)$$

To satisfy the identification criteria, the number of unknowns must be less than the number of observations $N_{obs}$, i.e.:

$$N_{obs} \geq (L+1)K$$

corresponding to K sets of Taylor expansions with L unknowns, and one extra angle parameter to each source. Thus, the number of sensor elements in the array increases linearly with the number of signal sources.

F. Design Issues

Real signals are seldom band-limited, and therefore the maximum frequency $f_{max}$ will not be well defined. However, a low-pass filter can always be applied to all sensors. Therefore, $f_{max}$ can be considered a design parameter, just as the size D of the array. The order L of the Taylor expansion can also be freely chosen by the particular use. In one practical implementation of the present disclosure, the design order is as follows:

1) D is given by the specific construction of the array.
2) $f_{max}$ is selected based on source excitation to get the best possible signal to noise ratio (SNR). However, it is necessary that $f_{max} \ll c/D$.
3) The Taylor expansion order L is a monotonically increasing function of $Df_{max}$ and L must satisfy the constraint (L+2) being less than or equal to N in order to obtain a unique solution.

It may be recommended to start with a first order Taylor expansion, i.e. L=1.

Figure 3A:
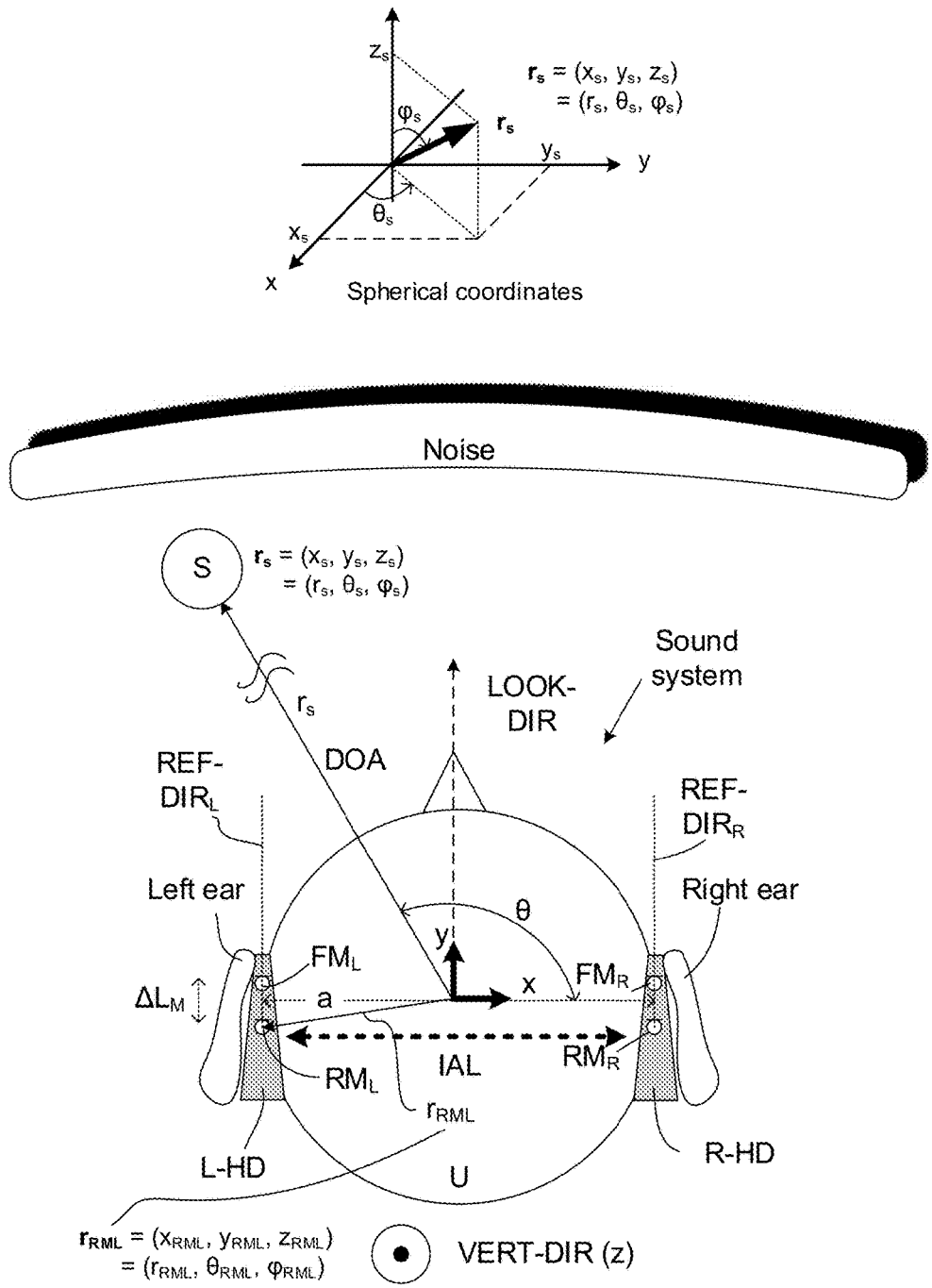
FIG. 3A shows a user wearing left and right hearing aids in a listening situation comprising a target sound source and noise.

FIG. 3A schematically illustrates the geometrical setup of a hearing aid user (U) wearing left and right hearing devices, e.g. hearing aids, (L-HD, R-HD) (e.g. forming a binaural hearing aid system) in a listening situation comprising a sound source (S), which—at a given point in time—is located at a specific point in space (e.g. defined by coordinates in a coordinate system, here having its centre in the head of the user U between the ears, as indicated by arrows x, y, z and as illustrated in the coordinate system in the top part of FIG. 3A). The coordinates of the sound source S in a spherical representation are $(\theta_s, r_s, (\varphi_s=90°))$ relative to the user. The sound scene further comprises one or more noise sources (Noise), which may be distributed or spatially located. Each of the left and right hearing aids comprises a part, often termed a BTE-part (BTE), adapted for being located behind an ear (Left ear, Right ear) of the user (U). The BTE-part comprises first ('Front') and second ('Rear') microphones ($FM_L$, $RM_L$; $FM_R$, $RM_R$) for converting an input sound to first and second electric input signals, respectively. The first and second microphones (FM, RM) of a given BTE-part, when located behind the relevant ear of the user (U), are characterized by transfer functions $H_{FM}(\theta, \varphi, r, k)$ and $H_{RM}(\theta, \varphi, r, k)$ representative of propagation of sound from the sound source S located at $(\theta, \varphi, r)$ around the BTE-part to the first and second microphones of the hearing aid (L-HD, R-HD) in question, where k is a frequency index. In the setup of FIG. 3, the target signal source S is assumed to be located in the frontal half-plane relative to the user (U) at an angle ($\theta$–90° in FIG. 3A) to the direction of the nose of the user (cf. LOOK-DIR in FIG. 3A), and to a microphone axis of the BTE-parts (cf. e.g. reference directions REF-$DIR_L$, REF-$DIR_R$, of the left and right hearing aids). A vector d comprising the transfer functions d=($H_{FM}(\theta, \varphi, r, k)$, $H_{RM}(\theta, \varphi, r, k)$) is termed the look vector for the microphones of the hearing device in question.

Figure 3B:
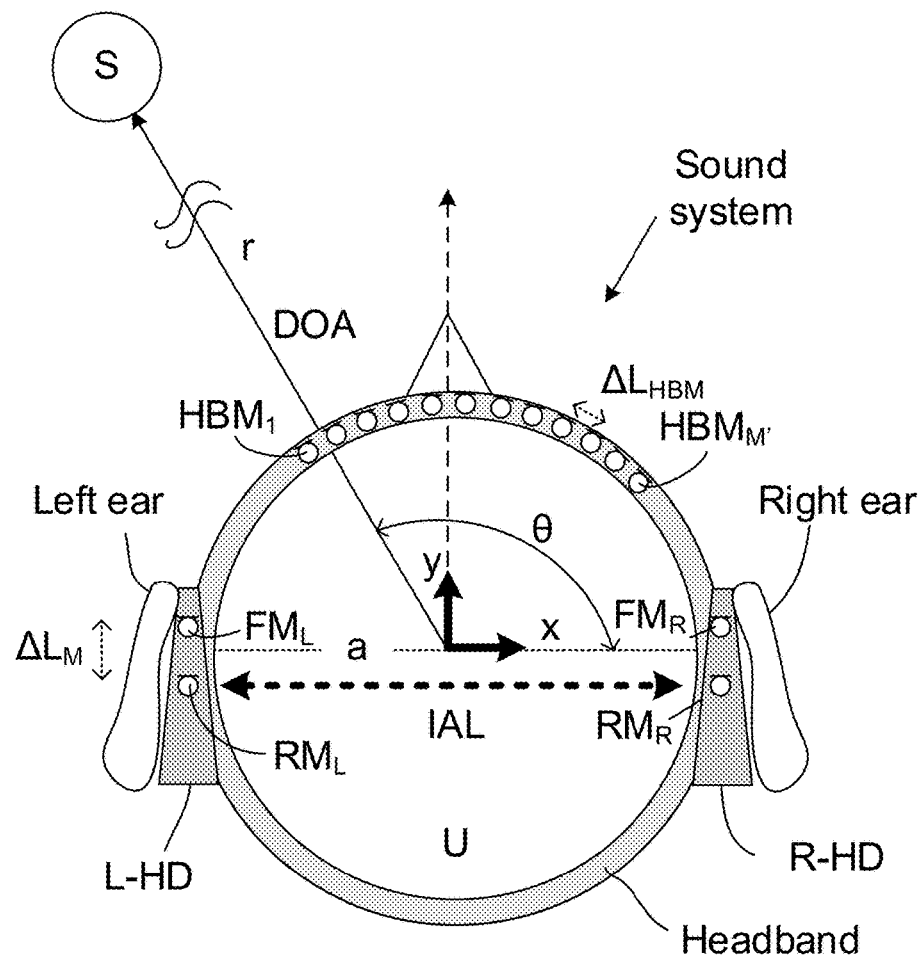
FIG. 3B shows a user wearing left and right hearing aids and a headband comprising a microphone array.

The first and second microphones of a given BTE-part are located at predefined distance $\Delta L_M$ apart (often referred to as microphone distance d). The two BTE-parts and thus the respective microphones of the left and right hearing aids, are located a distance a apart, when mounted on the user's head in an operational mode. In a situation where the user U is located in the acoustic far-field from source S, the distance $r_s$ from the user U to the sound source S can be assumed to be much larger than any distance ($\Delta L_M$ and/or a) between two neighboring microphones of the microphone array ($\Delta L_M$, a<<$r_s$), $r_s$ being not to scale as indicated by the broken indication of vector $r_s$ in FIG. 3A). The view in FIG. 3A is a planar view in a horizontal plane through the microphones of the first and second hearing aids (perpendicular to a vertical direction, indicated by out-of-plane arrow VERT-DIR (z) in FIG. 3A) and corresponding to plane z=0 ($\varphi$=90°). In a simplified model, it can be assumed that the sound sources ($S_i$) are located in a horizontal plane (e.g. the one shown in FIG. 3A). An interaural communication link between the left and right hearing aids is indicated by dashed arrow (denoted IAL) in FIG. 3A. The interaural communication link (IAL) is e.g. configured to allow audio signals (or parts thereof, e.g. selected frequency ranges, e.g. a low frequency part) and control and/or status signals to be exchanged between the hearing aids (or forwarded from one to the other or to an auxiliary device). In an embodiment, all four microphone signals (or selected frequency ranges thereof) are available in one or both hearing devices (and/or in an auxiliary device, cf. e.g. FIG. 4). In an embodiment, the four microphones ($FM_L$, $RM_L$, $FM_R$, $RM_R$) form part of (such as constitute) a sensor array in the sense of the present disclosure. In an embodiment, an array of microphones (e.g. each comprising three or more microphones, e.g. four microphones as shown in FIG. 1A) are located at each ear (and/or between the ears, e.g. on the forehead or distributed around the head, e.g. in a headband, cf. e.g. FIG. 3B, and networked together via the interaural link IAL (or respective communication links to an auxiliary device, cf. e.g. FIG. 4, or wired connections). A direction of arrival (DOA) of the sound from the sound source S to the user (U)—in practice to the mid-point of the user's head—is indicated in FIGS. 3A and 3B. The use of reference coordinate system is a matter of choice for the skilled person. An exemplary spherical coordinate system is shown for reference in the top part of FIG. 3A. It is assumed that the location of microphones of the microphone array or the microphone arrays are known (or can be determined) in a common reference coordinate system. This is indicated by the vector $r_{RML}$ to and coordinates of rear microphone $RM_L$ of the left hearing device L-HD ($r_{RML}$=($x_{RML}$, $y_{RML}$, $z_{RML}$) ($r_{RML}$, $\theta_{RML}$, $\varphi_{RML}$)). This and corresponding coordinates of the other microphones are e.g. stored in a memory of the sound system.

FIG. 3B illustrates a scenario as in FIG. 3A, but where the sound system additionally comprises an array of microphones located on the head (here the forehead) of the user (here indicated to form part of a headband (Headband). The locations of the (M') individual microphones $HBM_1$, ..., $HBM_{M'}$ of the headband are assumed to be known, here having equal distance $\Delta L_{HBM}$ between neighboring units. The microphones of the headband are connected to a processor of (at least) one of the hearing devices or to a separate processor, e.g. located in an auxiliary device, being configured to process all electric input signals from the individual microphones of the headband and of the left and right hearing devices. The microphones (e.g. being more than the two shown in FIGS. 3A and 3B, e.g. three or four) of the left and right hearing devices and the microphones of the headband may be considered as three individual arrays of microphones tied together by a network. As in the scenario of FIG. 3A it is assumed that the locations (e.g. coordinates (x, y) or (r, $\theta$)) of the individual microphones of the headband are known, and e.g. stored in a memory of the sound system. In the embodiment of FIG. 3B, the array of microphones is located over a limited length (area) of the headband. The microphones may, however, otherwise be distributed around the headband, e.g. evenly, or in individual groups, or be 'non-periodicly or randomly' distributed (with known locations), e.g. with higher 'density' (or a larger number) towards the front than towards the rear. Thereby, all angles around a user wearing the headband may be attended to.

Figure 4:
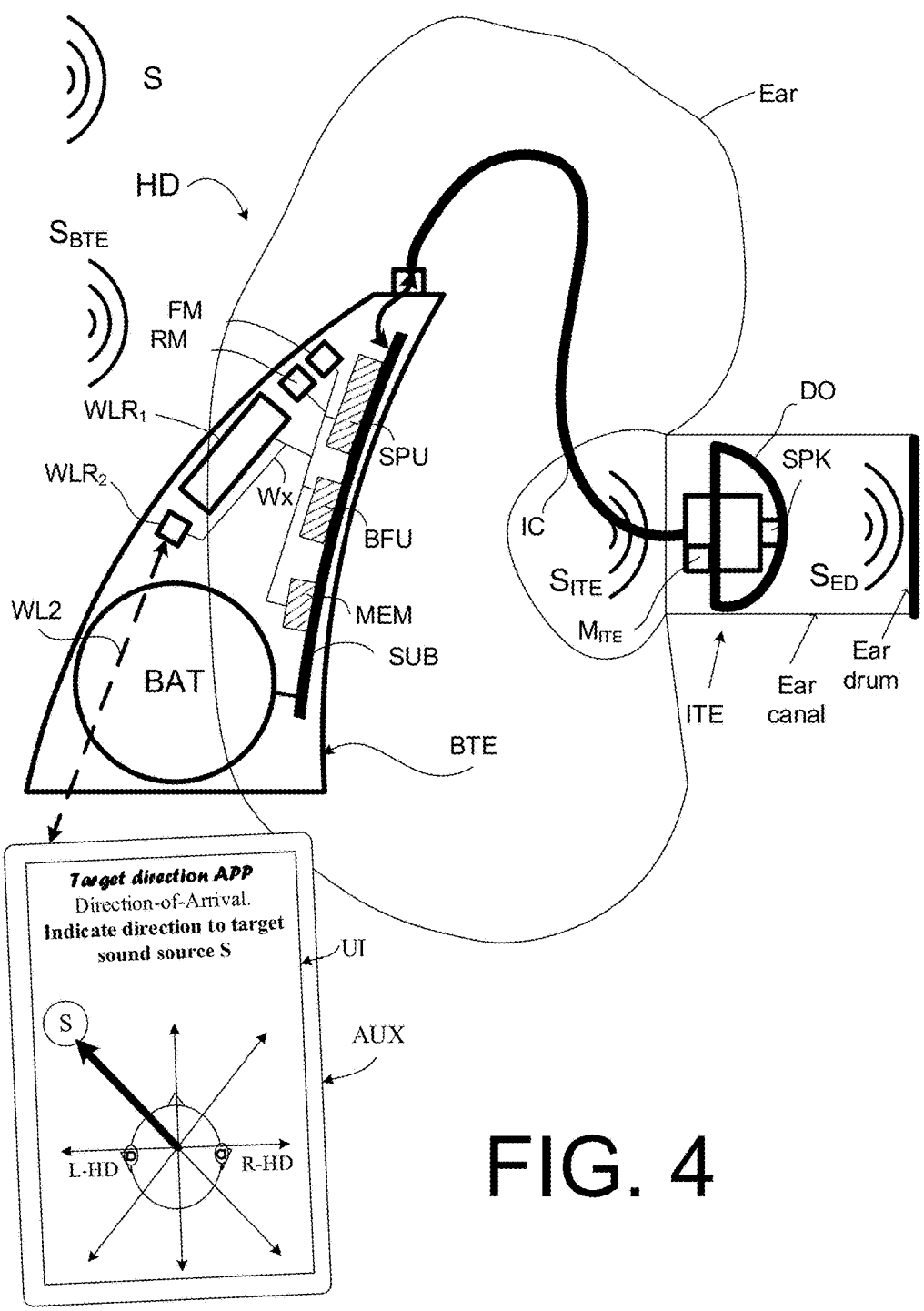
FIG. 4 shows an embodiment of a hearing aid according to the present disclosure comprising a BTE-part located behind an ear or a user and an ITE part located in an ear canal of the user, wherein the hearing aid is in communication with an auxiliary device comprising a user interface for the hearing aid.

FIG. 4 illustrates an exemplary hearing aid (HD) formed as a receiver in the ear (RITE) type hearing aid comprising a BTE-part (BTE) adapted for being located behind pinna and a part (ITE) comprising an output transducer (e.g. a loudspeaker/receiver, SPK) adapted for being located in an ear canal (Ear canal) of the user. The BTE-part (BTE) and the ITE-part (ITE) are connected (e.g. electrically connected) by a connecting element (/C). In the embodiment of a hearing aid of FIG. 4, the BTE part (BTE) comprises two input transducers (here microphones) (FM, RM) each for providing an electric input audio signal representative of an input sound signal ($S_{BTE}$) from the environment. In the scenario of FIG. 4, the input sound signal $S_{BTE}$ includes a contribution from sound source S, S being e.g. sufficiently far away from the user (and thus from hearing device HD) so that its contribution to the acoustic signal $S_{BTE}$ is in the acoustic far-field (alternatively, S may be located in the near-field relative to the hearing aid microphones). The hearing aid of FIG. 4 further comprises two wireless receivers ($WLR_1$, $WLR_2$) for providing respective directly received auxiliary audio and/or information signals. The hearing aid (HD) further comprises a substrate (SUB) whereon a number of electronic components are mounted, functionally partitioned according to the application in question (analogue, digital, passive components, etc.), but including a configurable signal processing unit (SPU), a beamformer filtering unit (BFU), and a memory unit (MEM) coupled to each other and to input and output units via electrical conductors Wx. The mentioned functional units (as well as other components) may be partitioned in circuits and components according to the application in question (e.g. with a view to size, power consumption, analogue vs. digital processing, etc.), e.g. integrated in one or more integrated circuits, or as a combination of one or more integrated circuits and one or more separate electronic components (e.g. inductor, capacitor, etc.). The configurable signal processing unit (SPU) provides an enhanced audio signal, which is intended to be presented to a user. In the embodiment of a hearing aid device in FIG. 4, the ITE part (ITE) comprises an output unit in the form of a loudspeaker (receiver) (SPK) for converting the electric signal (OUT) to an acoustic signal (providing, or contributing to, acoustic signal $S_{ED}$ at the ear drum (Ear drum). In an embodiment, the ITE-part further comprises an input unit comprising an input transducer (e.g. a microphone) ($M_{ITE}$) for providing an electric input audio signal representative of an input sound signal $S_{ITE}$ from the environment (including from sound source S) at or in the ear canal. In another embodiment, the hearing aid may comprise only the BTE-microphones (FM, RM). In another embodiment, the hearing aid may comprise more than the three microphones (FM, RM, $M_{ITE}$). In yet another embodiment, the hearing aid may comprise an input unit ($IT_3$) located elsewhere than at the ear canal in combination with one or more input units located in the BTE-part and/or the ITE-part. The ITE-part further comprises a guiding element, e.g. a dome, (DO) for guiding and positioning the ITE-part in the ear canal of the user.

The hearing aid (HD) exemplified in FIG. 4 is a portable device and further comprises a battery, e.g. a rechargeable battery, (BAT) for energizing electronic components of the BTE- and ITE-parts.

The hearing aid (HD) may e.g. comprise a directional microphone system (beamformer filtering unit (BFU)) adapted to enhance a target acoustic source among a multitude of acoustic sources in the local environment of the user wearing the hearing aid device. In an embodiment, the directional system is adapted to detect (such as adaptively detect) from which direction a particular part of the microphone signal (e.g. a target part and/or a noise part) originates (the DOA), as taught by the present disclosure. In an embodiment, the beamformer filtering unit is adapted to receive inputs from a user interface (e.g. a remote control or a smartphone) regarding an estimate of the present target direction (DOA). The memory unit (MEM) may e.g. comprise predefined (or adaptively determined) complex, frequency dependent constants ($W_{ij}$) defining predefined (or adaptively determined) or 'fixed' beam patterns (e.g. omni-directional, target cancelling, etc.), together defining a beamformed signal. The memory MEM may further have stored values of the coordinates of the individual microphones (FM, RM, $M_{ITE}$, ...) of the hearing device in an appropriate coordinate system (at least relative to a reference point, e.g. a fixed location in the hearing device).

The hearing aid of FIG. 4 may constitute or form part of a hearing aid and/or a binaural hearing aid system according to the present disclosure. The hearing aid may comprise an analysis filter bank, and the processing of an audio signal in a forward path of the hearing aid may e.g. be performed fully or partially in the time-frequency domain. Likewise, the processing of signals in an analysis or control path of the hearing aid may be fully or partially performed in the time-frequency domain.

The hearing aid (HD) according to the present disclosure may comprise a user interface UI, e.g. as shown in the lower part of FIG. 4 implemented in an auxiliary device (AUX), e.g. a remote control, e.g. implemented as an APP in a smartphone or other portable (or stationary) electronic device. In the embodiment of FIG. 4, the screen of the user interface (UI) illustrates a Target direction APP. The display of the auxiliary device schematically illustrates a screen of the Direction-of-Arrival-APP instructing a user to Indicate direction to target sound source S. A (approximate) direction to the present target sound source (S) may be indicated from the user interface, e.g. by dragging the sound source symbol to a currently relevant direction relative to the user. The currently selected target direction is to the left of the frontal direction (at θ~45° (+90°), cf. FIG. 3) as indicated by the bold arrow to the sound source S. The auxiliary device and the hearing aid are adapted to allow communication of data representative of the currently indicated direction (e.g. for use as a first estimate for the algorithm) to the hearing aid via a, e.g. wireless, communication link (cf. dashed arrow WL2 in FIG. 4). The auxiliary device (AUX) and the hearing aid (HD) are adapted to allow the exchange of data representative of a direction to the target sound source (DOA) (and optionally audio signals and other control or information signals) between them via a, e.g. wireless, communication link (cf. dashed arrow WL2 in FIG. 4). The communication link WL2 may e.g. be based on far field communication, e.g. Bluetooth or Bluetooth Low Energy (or similar technology), implemented by appropriate antenna and transceiver circuitry in the hearing aid (HD) and the auxiliary device (AUX), indicated by transceiver unit $WLR_2$ in the hearing aid. An interaural link may be established between two hearing aids of a binaural hearing system using respective wireless transceivers $WLR_1$, e.g. to exchange audio data, to avail a multitude of microphone signals (or parts thereof) for an algorithm according to the present disclosure to precisely determine a direction (DOA) to a target sound source.

Figure 5:
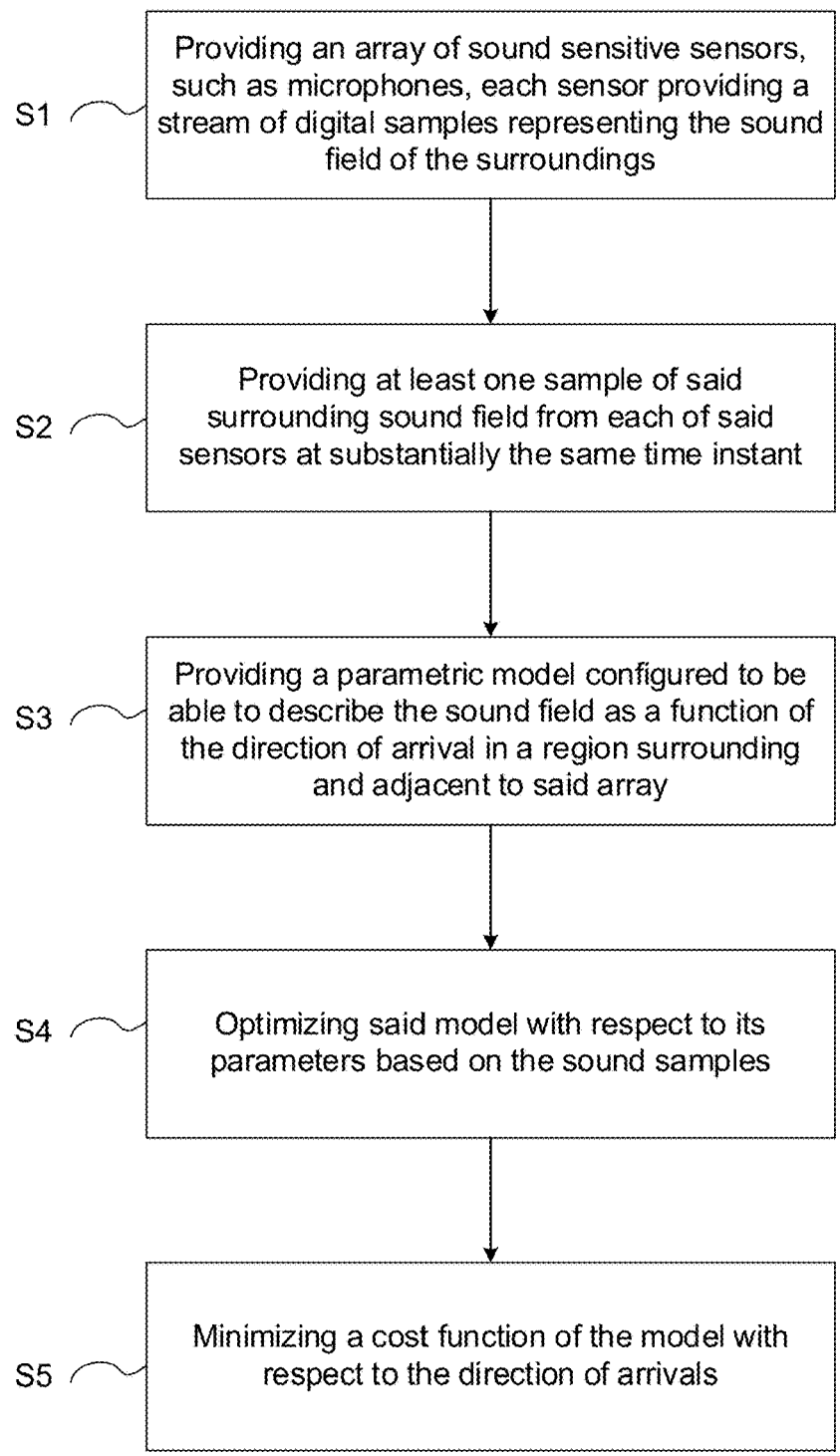
FIG. 5 shows a flow diagram for a method of providing a direction of arrival of sound from a sound source to a sound system according to the present disclosure.

FIG. 5 shows a flow diagram for a method of operating a hearing device, e.g. a hearing aid according to the present disclosure.

The method provides a scheme for estimating the direction of arrival of sound emitted by one or more sound sources creating a sound field in the surroundings of the one or more sound sources. The method comprises:

S1. providing an array of sound sensitive sensors, such as microphones, each sensor providing a stream of digital samples representing the sound field of the surroundings;

S2. providing at least one sample of said surrounding sound field from each of said sensors at substantially the same time instant;

S3. providing a parametric model configured to be able to describe the sound field as a function of the direction of arrival in a region surrounding and adjacent to said array;

S4. optimizing said model with respect to its parameters based on said sound samples; and S5. minimizing a cost function of the model with respect to said direction of arrivals.

Figure 6:
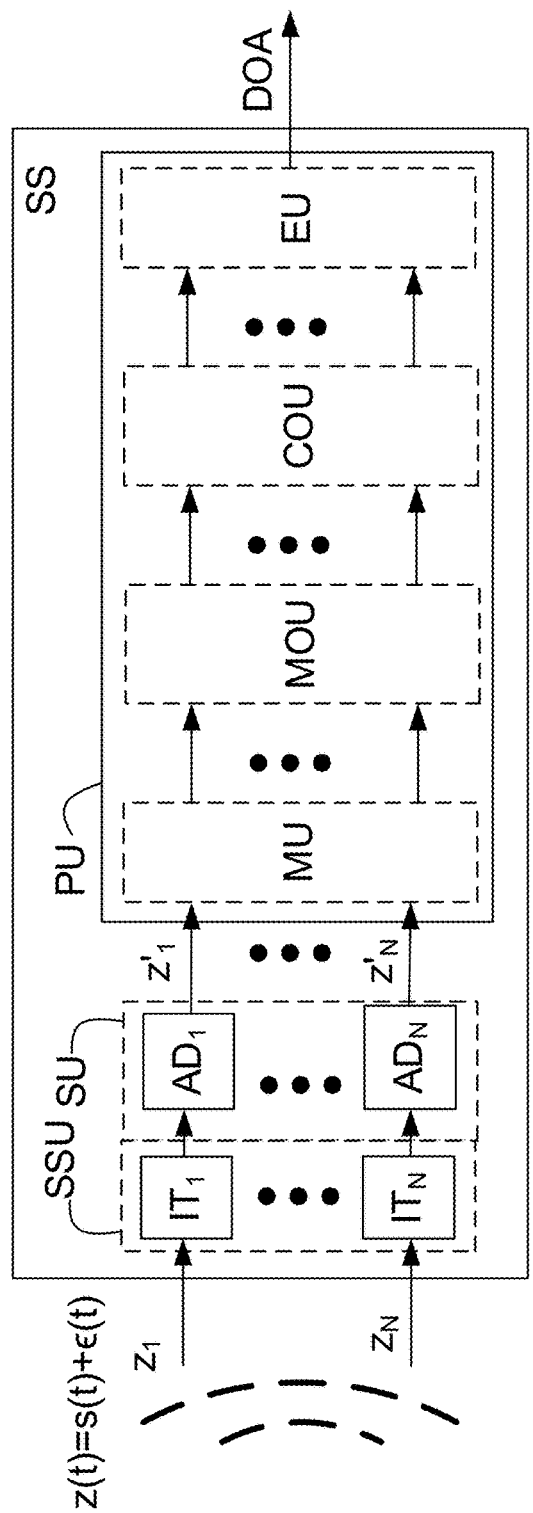
FIG. 6 shows a simplified block diagram of an embodiment of a sound system according to the present disclosure.

FIG. 6 shows an embodiment of a sound system (SS) for estimating the direction of arrival of a sound signal emitted from one or more sound sources according to the present disclosure. The sound system receives composite signals $z_1, \ldots, z_N$ at respective input transducers $IT1, \ldots, IT_N$ from a surrounding sound field. The sound field comprises a time-varying mixture of one or more (target, e.g. speech) sound sources $S_j$, j=1, $N_{ss}$ (e.g. one sound source, S, as indicated in FIG. 3A, 3B (i.e. $N_{ss}$=1)) and additional noise, as indicated in FIG. 6 by input sound signal z(t)=s(t)+ϵ(t), where ϵ(t) represents noise. The sound system (SS) comprises a sound sensor unit (SSU) comprising an array of N sound receiving transducers (e.g. microphones), each providing an analogue electric input signal representative of the sound signal $z_1, z_N$ received at a respective input transducer. The sound system (SS) further comprises a sampling unit (SU) for providing at least one sample of the surrounding sound field from each of electric input signals at substantially the same time instant. The sampling unit (SU) comprises analogue to digital converters $AD_1, \ldots, AD_N$ coupled to a respective one of the input transducers $IT_1, \ldots, IT_N$, and providing respective digitized electric input signals as streams of samples $z'_1, \ldots, z'_N$. The sound system (SS) further comprises a processing unit (PU) comprising a) a model unit (MU) comprising a parametric model configured to be able to describe the sound field at the array of N sound receiving transducers as a function of the direction of arrival (DOA) in a region surrounding and adjacent to the array, b) a model optimizing unit (MOU) configured to optimize said model with respect to its parameters based on said sound samples, c) a cost optimizing unit (COU) configured to minimize a cost function of the model with respect to said direction of arrivals (DOA); and an estimating unit (EU) configured to estimate the (final) direction of arrival (DOA) based on said parametric model with the optimized parameters and the optimized cost function. In an embodiment, the sampling unit is configured to sample the analogue electric input signals with a relatively low sampling frequency, e.g. below 1 kHz, such as below 500 Hz. Thereby a low pass filtering of the electric input signals is effectively provided. In an embodiment, the sampling frequency is configured to isolate a fundamental frequency of the electric input signals. In an embodiment, the sampling frequency is configured to isolate a fundamental frequency corresponding to a human voice from higher lying harmonics and providing respective filtered electric input signals $z'_1, \ldots, z'_N$. In an embodiment, the sound system is configured to use such filtered electric input signals for identification of the direction of arrival.

Figure 7:
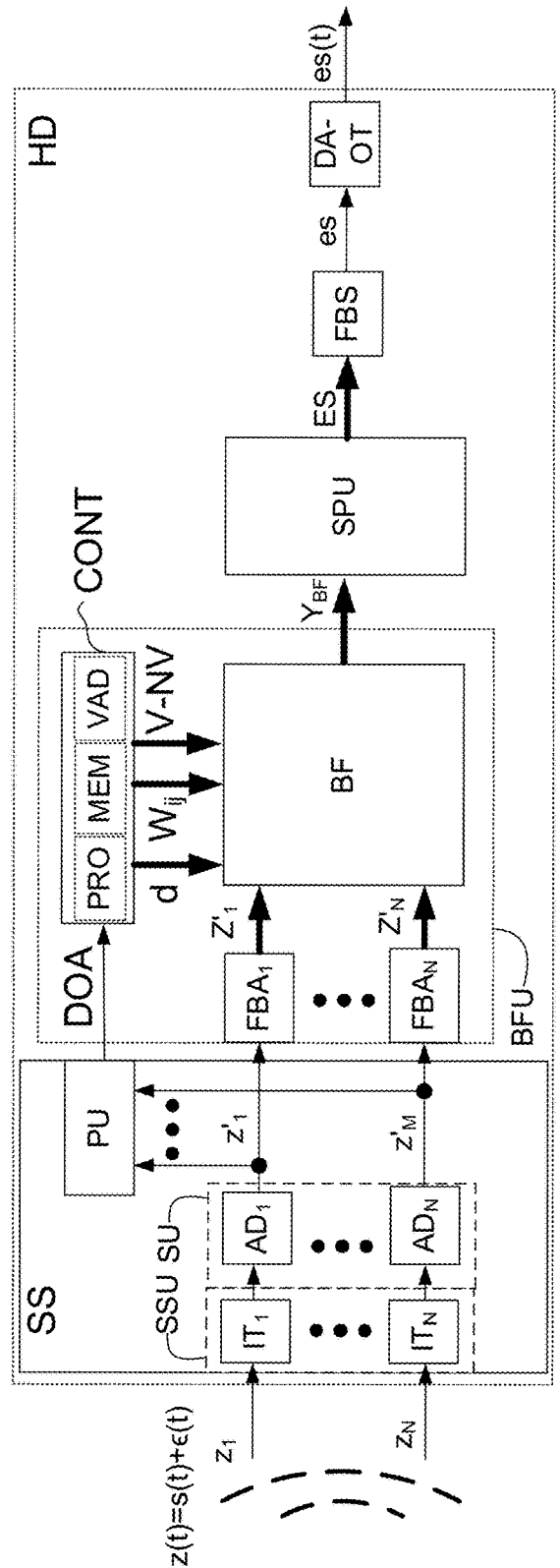
FIG. 7 shows a simplified block diagram of an embodiment of a hearing device comprising a beamformer filtering unit and a sound system according to the present disclosure.

FIG. 7 shows a simplified block diagram of an embodiment of a hearing device (HD) comprising a beamformer filtering unit (BFU) for providing a beamformed signal $Y_{BF}$ based on a multitude of electric sound signals $z'_1, \ldots, z'_N$ received from a sound system (SS) according to the present disclosure. Alternatively, the beamformer filtering unit may user electric input signals from other input transducers. The hearing device (HD) further comprises a signal processing unit (SPU) for processing the beamformed signal, e.g. according to a user's needs, e.g. to a user's hearing impairment and providing a processed signal ES, which is fed to an output unit (FBS, DA-OT) for providing a time-variant signal es(t) perceivable as sound to the user. FIG. 7 shows an embodiment of hearing device HD, e.g. a hearing aid, according to the present disclosure. A time variant input sound z(t) is assumed to comprise a mixture of a target signal component s(t) and a noise signal component €(t) is picked up by the hearing device, processed and provided in a processed form to a user wearing the hearing device as an audible signal (cf. e.g. FIG. 3A, 3B). The sound source system (SS) of the hearing device of FIG. 7 comprises a sound sensor unit (SSU) comprising a multitude of input transducers $IT_j$, j=1, ..., N, each providing an (analogue) electric input signal representative of sound $z_i(t)$, and a sampling unit (SU) comprising a multitude of analogue to digital converters $AD_j$ providing digitized versions $z'_1, \ldots, z'_M$ of the electric input signal. The (digital) electric input signals $z'_1, \ldots, z'_M$ are fed to the processing unit (PU) of the sound source system (SS) and to respective analysis filter bank unit $FBA_j$ of the beamformer filtering unit (BFU). The processing unit (PU) processes the electric input signals $z'_1, \ldots, z'_M$, according to a method of the present disclosure, and provides a (final) direction of arrival (DOA) that is fed to a control unit (CONT) of the beamformer filtering unit (BFU). The analysis filter bank units $FBA_j$, j=1, ..., N, are configured to convert the electric time-domain signal $z'_j$ to a number of frequency sub-band signals (k=1, ..., K), thereby providing the electric inputs signals $z'_j$, j=1, ..., N, in a time-frequency representation $Z_j(k,m)$, k being a frequency sub-band index (k=1, ..., K) and m being a time frame index. The multi-input beamformer filtering unit (BFU) further comprises a beamformer (BF) and a control unit CONT. The beamformer BF (and optionally the control unit CONT) receives the multitude of electric input signals $Z'_i$, i=1, ..., N (or possibly other electric input signals representative of a current sound field around the user wearing the hearing device), and provides beamformed signal $Y_{BF}$. The control unit CONT comprises a memory MEM wherein complex weights $W_{ij}$ can be stored. The complex weights $W_{ij}$ define possible pre-defined (or previously updated) 'fixed' beam formers of the beamformer filtering unit BFU (fed to BF via signal $W_{ij}$). The control unit (CONT) comprises a processor PRO, e.g. for updating look vector d and/or beamformer filtering weights $W_{ij}$, e.g. influenced or based on the DOA. The control unit CONT further comprises one or more voice activity detectors VAD for estimating whether or not a given input signal (e.g. whether or not a given time-frequency unit of the input signal) comprises (or is dominated by) a voice. Respective control signals V-NV (voice-no voice) are used in the control unit CONT to determine the look vector d and/or beamformer filtering weights $W_{ij}$, and is further fed to the beamformer BF. In an embodiment, the control unit CONT is configured to receive the multitude of electric input signals Z', i=1, ..., N, from analysis filter banks $FBA_j$ and the beamformed signal $Y_{BF}$ from the beamformer BF. The signal $Y_{BF}$ comprises an estimate of the target signal component of the input sound field. The hearing device HD may further comprise a (single channel) post filtering unit receiving (spatially filtered) target signal estimate $Y_{BF}$ (and a corresponding spatially filtered) noise signal estimate, to provide a (further) noise reduced target signal estimate $Y_{NR}$, e.g. based on knowledge of the noise part of the electric input signals $Z'_i$, i=1, ..., N. The hearing aid further comprises a signal processing unit SPU for (further) processing the beamformed and possibly further noise reduced signal (possibly including the mentioned post filtering unit) and providing a processed signal ES. The signal processing unit SPU may be configured to apply a level and frequency dependent shaping of the noise reduced signal $Y_{BF}$ ($Y_{NR}$), e.g. to compensate for a user's hearing impairment. The hearing aid further comprises a synthesis filter bank FBS for converting the processed frequency sub-band signal ES to a time domain signal es, which is fed to an output unit DA-OT (comprising digital to analogue converter DA and an output transducer OT) for providing stimuli es(t) to a user as a signal perceivable as sound. The output transducer OT may e.g. comprise a loudspeaker for presenting the processed signal es to the user as sound or a vibrator of a bone-conducting hearing device. The forward path from the input unit to the output unit of the hearing aid is here operated partly in the time-frequency domain (processed in a number of frequency sub-bands $FB_k$, k=1, ..., K). In another embodiment, the forward path from the input unit to the output unit of the hearing aid may be operated in the time domain. The hearing aid may further comprise a user interface and one or more detectors allowing user inputs and detector inputs to be received by the beamformer filtering unit, e.g. the control unit CONT (cf. e.g. FIG. 4). An adaptive functionality of the beamformer filtering unit BFU may be provided based on the current DOA estimated according to the present disclosure. In an embodiment, the beamformer filtering unit is configured to track a number of sound sources, by individually estimating a direction of arrival from each of the number of sound sources on a continuous basis.

In an embodiment (as shown in FIG. 7), at least some of (such as a majority or all of) the sound sensors (here microphones) used for the DOA estimation (in the sound system unit SS) are also used as inputs to the beamformer filtering unit. It should be noted that the (typical) minimum distance requirement of hearing aid microphones can be dispensed with when a multi-microphone array using the scheme of the present disclosure is used. A sound sensor array comprising a multitude N of microphones (e.g. N≥4 or N≥8), in any spatial configuration—fixated in space relative to each other—when used to provide spatial domain filtering is not constrained to configurations of having the distance of a half-wavelength that is necessary in the delay-and-sum beamforming technology currently being used in hearing devices. According to the present disclosure, a flexible spatial configuration is possible.

Figure 8:
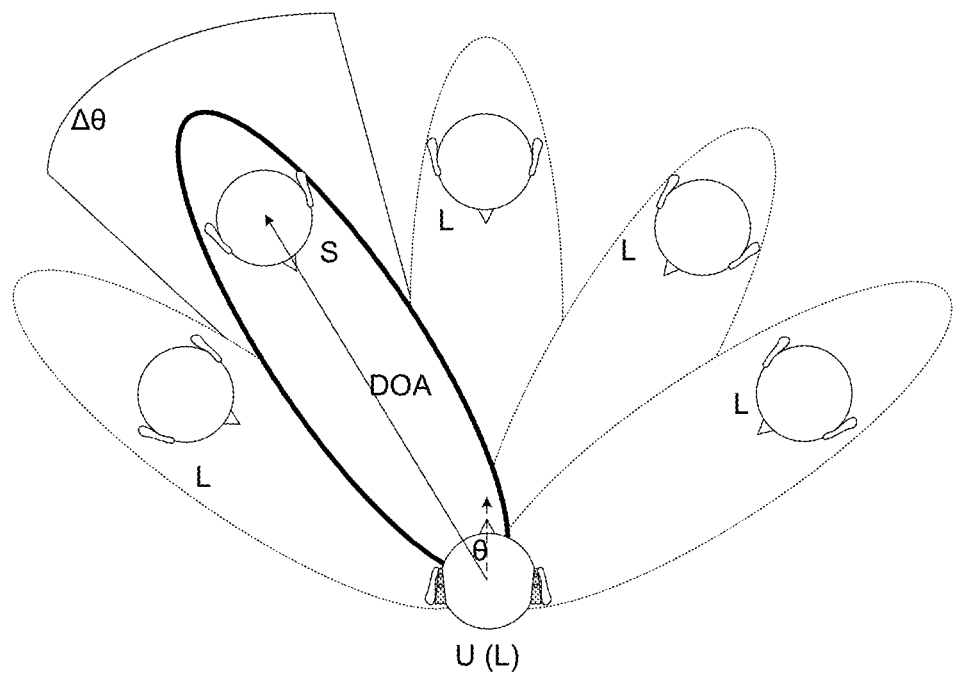
FIG. 8 shows an application of a hearing device or a hearing system according to the present disclosure for segregating individual sound sources in a multi-sound source environment.

With reference to FIG. 8 illustrating a 'table conversation situation' with quasi constant location of a multitude of occasional talkers/listeners, look vectors (transfer functions from source to microphones) and/or filter weights corresponding to a particular DOA may be determined and stored in the memory unit MEM of the control unit CONT in FIG. 7, so that they can be quickly loaded into the beamformer (BF) when the talker of a given DOA is active (again). Thereby the non-active beams can be considered to represent virtual microphones that can be activated one at a time, or two or more simultaneously.

FIG. 8 shows an application of a hearing device or a hearing system according to the present disclosure for segregating individual sound sources in a multi-sound source environment. In FIG. 8, the sound sources are persons (that at a given time are talkers (S) or listeners (L)) located around a user (U, that at the time illustrated is a listener (L)). The user (U) may wear a sound system comprising a head-mounted array of microphones according to the present disclosure that allows segregation of each talker and allows the user to tune in depending on the person (S) that is currently speaking as indicated by (schematic) elliptic beams of angular width ($\Delta\theta$) sufficiently small to enclose one (and only one) of the persons surrounding the user. In the example of FIG. 8, the person speaking is indicated by S, and the sound system is focused on this person as indicated by direction of arrival (DOA) and a bold elliptic beam including the speaker (S). The angular width of the beam (main lobe) is preferably of the order of 30° or smaller, e.g. smaller than 25°, cf. e.g. FIG. 9.

Figure 9:
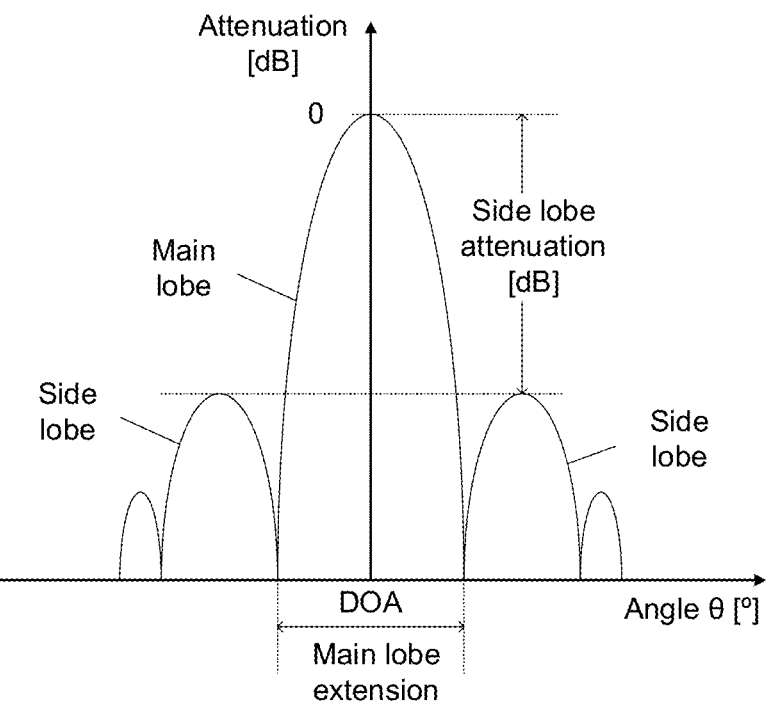
FIG. 9 schematically shows a plot of attenuation versus angle (at a specific frequency) for a sound system comprising an array of sound sensitive sensors according to the present disclosure.

FIG. 9 schematically shows a plot of attenuation ([dB]) versus angle ([°] (at a specific frequency, e.g. 2 kHz) for a sound system comprising an array of sound sensitive sensors according to the present disclosure. The plot illustrates a main lobe centered around a direction of arrival (DOA) and a number of side lobes. A (first) side lobe attenuation [dB] is indicated as the attenuation of a first side lobe compared to the main lobe. The attenuation of a first side lobe compared to the main lobe is e.g. arranged to be larger than 10 dB, such as larger than 15 dB. The angular width of the main lobe (denoted $\Delta\theta$ in FIG. 8) is preferably configurable, and e.g. configured to be smaller than 30°, such as smaller than 20°.

Figure 10:
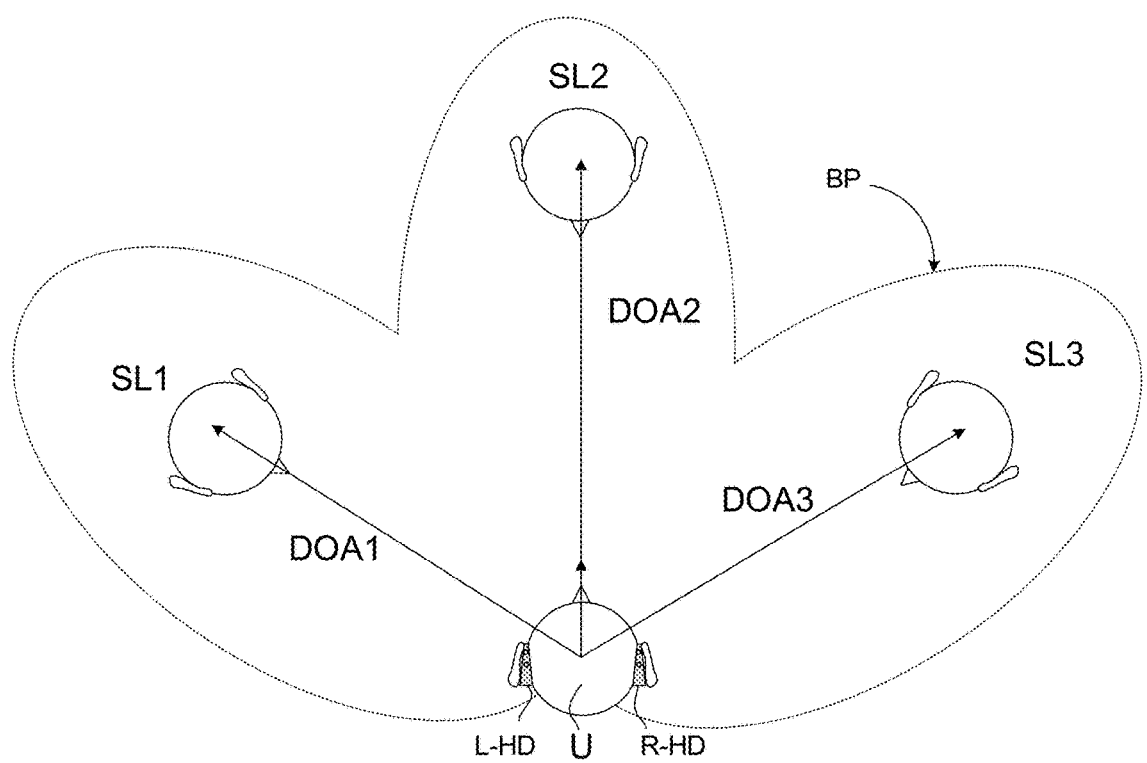
FIG. 10 illustrates a multi-target sound source direction of arrival estimation situation where a hearing system according to the present disclosure estimates a target maintaining beam pattern having focus on all (three) target sound sources.

FIG. 10 illustrates a situation where the hearing device or hearing system (L-HD, R-HD) according to the present disclosure is configured to determine (and possibly track) a multitude of directions of arrival (here three, DOA1, DOA2, DOA3) to sound sources of interest (e.g. sources comprising modulated signals, e.g. speech, SL1, SL2, SL3) in the environment of the user (U) wearing the hearing device or hearing system. The directions of arrival (DOA1, DOA2, DOA3) as determined by the sound system as described above are used by a beamformer filtering unit of the hearing devices (L-HD, R-HD), individually and/or binaurally (cf. e.g. FIG. 7), to determine a beam pattern (BP) that attempts to maintain (target) sound from the (target) sound sources of interest (SL1, SL2, SL3) to the user (U) (and to attenuate sound from other directions). In an embodiment, the hearing device or hearing system is configured to track the active target sound sources over time and thus maintain focus of the beam pattern (BP) on the active sound sources (even if the user and sound sources move relative to each other). In an embodiment the tracking unit is configured to use near-field tracking as described in [Gustafsson et al., 2015]: In target tracking, a dynamic motion model of the form $$x(t+1) = f(x(t), v(t)) \qquad (20)$$

describes the motion of the target over time. The state x(t) includes the position (X(t), Y(t)) at time t, and v(t) denotes process noise. By letting the delay $\tau_n(X(t), Y(t))$ (see eq. (18) below) be time varying, a more or less standard nonlinear estimation problem is achieved, where the measurement equation is $$z(t) = T^T(X, Y)S(t) + \epsilon(t) \qquad (19)$$

where T is the regression matrix (cf. eq. (10), (11) above), and where the delay is given by $$\tau_n(X, Y) = \frac{1}{c}\sqrt{(x_n - X)^2 + (y_n - Y)^2} \qquad (18)$$

The present concepts can be used in many different applications, e.g. to control of the beam(s)/beam former(s), e.g. to steer the direction of an active beam, e.g. in combination with a direction selecting (pointer) device, e.g. using (possibly ear-based) electrooculography EarEOG, etc., cf. e.g. US20140098981A1 and [Manabe et al.; 2013]. EOG may be used to extract a user's (currently) preferred listening direction. Other means of assessing preference, e.g. a "control wheel on a smart phone", may be used to define the preferred direction/DOA ($\theta$). Using the concept of virtual microphones that can be activated at will, listening to a multitude of sound sources does necessarily require attenuation of all other sources. The preferred direction(s) can simply be emphasized, e.g. by 10 dB. Thereby the listening scene of the other sources is not lost.

Details of the DOA estimation method are provided in an article by the present inventors [Gustafsson et al., 2015], to which the equation numbers used in the present disclosure refer.

It should be appreciated that reference throughout this specification to "one embodiment" or "an embodiment" or "an aspect" or features included as "may" means that a particular feature, structure or characteristic described in connection with the embodiment is included in at least one embodiment of the disclosure. Furthermore, the particular features, structures or characteristics may be combined as suitable in one or more embodiments of the disclosure. The previous description is provided to enable any person skilled in the art to practice the various aspects described herein. Various modifications to these aspects will be readily apparent to those skilled in the art, and the generic principles defined herein may be applied to other aspects. The claims are thus not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more.

Accordingly, the scope should be judged in terms of the claims that follow.

REFERENCES

[Doron & Nevet; 2008]), Miriam A. Doron and Amir Nevet, "Robust wavefield interpolation for adaptive wideband beamforming," Signal Processing, vol. 88, no. 6, pp. 1579-1594, June 2008.

US20140098981A1 (OTICON) Oct. 4, 2014

[Manabe et al.; 2013] Hiroyuki Manabe, Masski Fukumoto, Tohru Yagi, "Conductive Rubber Electrodes for Earphone-Based Eye Gesture Input Interface", ISWC'13, Sep. 9-12, 2013, Zurich, Switzerland, pp. 33-39.

[Gustafsson et al., 2015] Fredrik Gustafsson, Gustaf Hendeby, David Lindgren, George Mathai, and Hans Habberstadt, "Direction of Arrival Estimation in Sensor Arrays Using Local Series Expansion of the Received Signal", 18TH INTERNATIONAL CONFERENCE OF INFORMATION FUSION, 6 Jul. 2015, pages 761-766.

The invention claimed is:

1. A hearing aid, comprising:
    a sound system for estimating the direction of arrival of a sound signal emitted from one or more sound sources, the system comprising:
    a sound sensor unit comprising an array of N sound receiving transducers, each providing an electric input signal;
    a sampling unit for providing at least one sample of said surrounding sound field from each of said electric input signals at substantially the same time instant; and
    a processing unit comprising
        a model unit comprising a parametric model configured to be able to describe the sound field at the array as a function of the direction of arrival in a region surrounding and adjacent to the array;
        a model optimizing unit configured to optimize said model with respect to its parameters based on said sound samples;
        a cost optimizing unit configured to minimize a cost function of the model with respect to said direction of arrivals; and
        an estimating unit configured to estimate the direction of arrival based on said parametric model with the optimized parameters and the optimized cost function.

2. A hearing device according to claim 1, wherein said array of sound sensitive sensors is or comprises an array of microphones configured to be worn by a user.

3. A hearing device according to claim 1 wherein said array of sound sensitive sensors comprises microphones integrated on a chip, or MEMS microphones.

4. A hearing device according to claim 1 wherein the number N of sound sensitive sensors is larger than 3.

5. A hearing device according to claim 1 configured to provide that the distance between adjacent sound sensitive sensors is smaller than 0.01 m.

6. A hearing device according to claim 1 comprising a beamformer filtering unit for providing a beamformed signal based on one or more beamformer input signals representing said surrounding sound field, and configured to use said estimate the direction of arrival in the determination of the beamformed signal.

7. A hearing device according to claim 6 configured to provide that said beamformer filtering unit receives at least some of said electric input signals from said sound sensor array, and provides said beamformed signal as a weighted combination of said at least some of said electric input signals and possibly further electric input signals.

8. A hearing device according to claim 6, wherein
    the hearing device is configured to estimate a direction of arrival of a multitude of active target sound sources, and
    the beamformer filtering unit is configured to determine a beam pattern based on estimates of direction of arrival of a multitude of active target sound sources.

9. A hearing device according to claim 8 configured to activate beams at different direction of arrivals at the same time.

10. A hearing device according to claim 1 comprising a filter configured to isolate a fundamental frequency of the electric input signals corresponding to a human voice from higher lying harmonics and providing respective filtered electric input signals, and to use such filtered electric input signals for identification of the direction of arrival.

11. A hearing device according to claim 1 comprising a tracking unit configured to track one or more sound sources over time.

12. A hearing device according to claim 1 configured to estimate a direction of arrival to a multitude of active target sound sources.

13. A hearing device according to claim 1 comprising a network of arrays of sound sensitive sensors.

14. A hearing device according to claim 1 wherein the hearing aid comprises a behind-the-ear hearing aid or an in-the-ear hearing aid or hearing glasses or a headband.

15. A hearing device according to claim 1 comprising a user interface allowing a user to control functionality of the device.

16. A non-transitory computer readable medium having stored on application, termed an APP, comprising executable instructions configured to be executed on an auxiliary device to implement a user interface for a hearing device as described in claim 1.

17. An APP according to claim 16 configured to run on a cellular phone or on another portable device allowing communication with said hearing device.

18. A method for estimating the direction of arrival of sound emitted by one or more sound sources creating a sound field in the surroundings of the one or more sound sources, the method comprising:
    providing, using an array of sound sensitive sensors of a hearing aid, an electric input signal, from each sensor, comprising a stream of digital samples representing the sound field of the surroundings;
    providing, using a sampling unit of the hearing aid, at least one sample of said surrounding sound field from each of said sensors at substantially the same time instant;
    providing, using a processing unit of the hearing aid, a parametric model configured to be able to describe the sound field as a function of the direction of arrival in a region surrounding and adjacent to said array;
    optimizing, using a processing unit of the hearing aid, said model with respect to its parameters based on said sound samples;
    minimizing, using the processing unit of the hearing aid, a cost function of the model with respect to said direction of arrivals; and estimate, using the processing unit of the hearing aid, the direction of arrival based on said parametric model with the optimized parameters and the optimized cost function.

19. A method according to claim 18, wherein said model is a Taylor expansion model and the sound signal received at each of said respective sensor is decomposed in a Taylor series expansion of order L, in which the signal derivatives are determined by a linear least squares method, and wherein the direction of arrival □ is estimated by the expression:

where $\|\cdot\|2$ represents the least squares loss (or error) function, z is a mixed signal comprising sound signal s and additional noise $\epsilon$, and $T(\theta)$ is a vector comprising the first L Taylor expansion coefficients.

* * * * *